United States Patent [19]
Saito et al.

[11] Patent Number: 5,581,644
[45] Date of Patent: *Dec. 3, 1996

[54] TRANSMISSION LINE SWITCHING APPARATUS

[75] Inventors: Kazuhito Saito; Masayuki Nishimura; Tohru Yamanishi, all of Yokohama; Hideo Kobayashi, Mito; Toshiaki Katagiri, Tokyo; Masao Tachikura, Hitachi, all of Japan

[73] Assignees: Sumitomo Electric Industries, Ltd., Osaka; Nippon Telegraph & Telephone Corporation, Tokyo, both of Japan

[*] Notice: The term of this patent shall not extend beyond the expiration date of Pat. No. 5,386,485.

[21] Appl. No.: 355,246

[22] Filed: Dec. 8, 1994

Related U.S. Application Data

[63] Continuation-in-part of Ser. No. 22,641, Feb. 25, 1993, Pat. No. 5,386,485.

[30]  Foreign Application Priority Data

| Feb. 26, 1992 | [JP] | Japan | 4-39602 |
| Feb. 26, 1992 | [JP] | Japan | 4-39607 |
| Apr. 23, 1992 | [JP] | Japan | 4-104612 |
| May 11, 1992 | [JP] | Japan | 4-117361 |
| May 11, 1992 | [JP] | Japan | 4-117363 |
| May 21, 1992 | [JP] | Japan | 4-128777 |
| Feb. 4, 1993 | [JP] | Japan | 5-017484 |

[51] Int. Cl.$^6$ .............................. G02B 6/24; B25J 11/00
[52] U.S. Cl. .................. 385/17; 385/20; 385/63; 385/135; 901/16
[58] Field of Search ................... 385/17, 71, 20, 385/25, 135, 16, 137, 63; 901/14, 16, 73, 6; 174/250; 361/727, 729, 865, 866, 877, 878

[56]  References Cited

U.S. PATENT DOCUMENTS

| 4,193,662 | 3/1980 | Hara | 385/22 |
| 4,955,686 | 9/1990 | Buhrer et al. | 385/17 |
| 5,002,355 | 3/1991 | Caron | 385/16 X |
| 5,100,286 | 3/1992 | Anderson | 901/16 X |
| 5,243,872 | 9/1993 | Yang et al. | 901/16 X |
| 5,386,485 | 1/1995 | Saito et al. | 385/17 |

FOREIGN PATENT DOCUMENTS

| 0323920 | 7/1989 | European Pat. Off. . |
| 0463749 | 1/1992 | European Pat. Off. . |
| 3743108 | 7/1989 | Germany . |
| 8905509 | 8/1989 | Germany . |

OTHER PUBLICATIONS

Yoshida et al, "A New Automated Main Distributing Frame System Using Robot", International Conference on Communications, vol. 2/3, 26 Jun. 1991, Denver–USA 977–982.
Patent Abstract Of Japan, vol. 7, No. 87 p. 190–1232 12 Apr. 1983 and JP–A–58 014 807 (Nippon Denshin Denwa Kisha) 27 Jan. 1983.

*Primary Examiner*—Rodney B. Bovernick
*Assistant Examiner*—Hemung Sanghavi
*Attorney, Agent, or Firm*—Cushman Darby & Cushman, L.L.P.

[57]  ABSTRACT

There is disclosed a transmission line switching apparatus comprising a coupling board having a first surface adapted to be connected a first line and a second surface adapted to be connected a second line, adjusting means having a line length adjusting unit for handling surplus portions of the second lines and switching means for changing the connection between the first and second lines, and partition means for dividing the second surface of the coupling board into a plural rows.

40 Claims, 20 Drawing Sheets

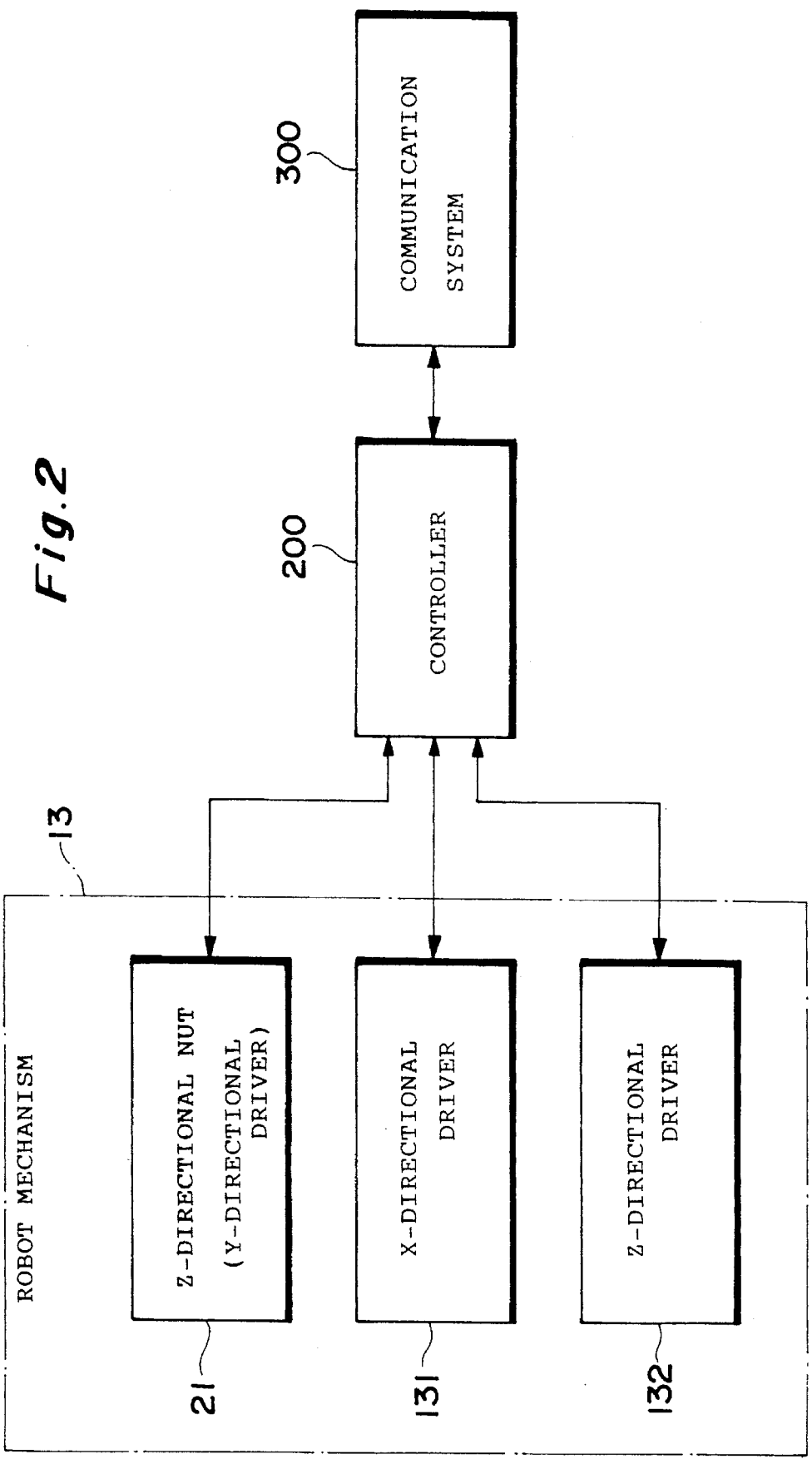

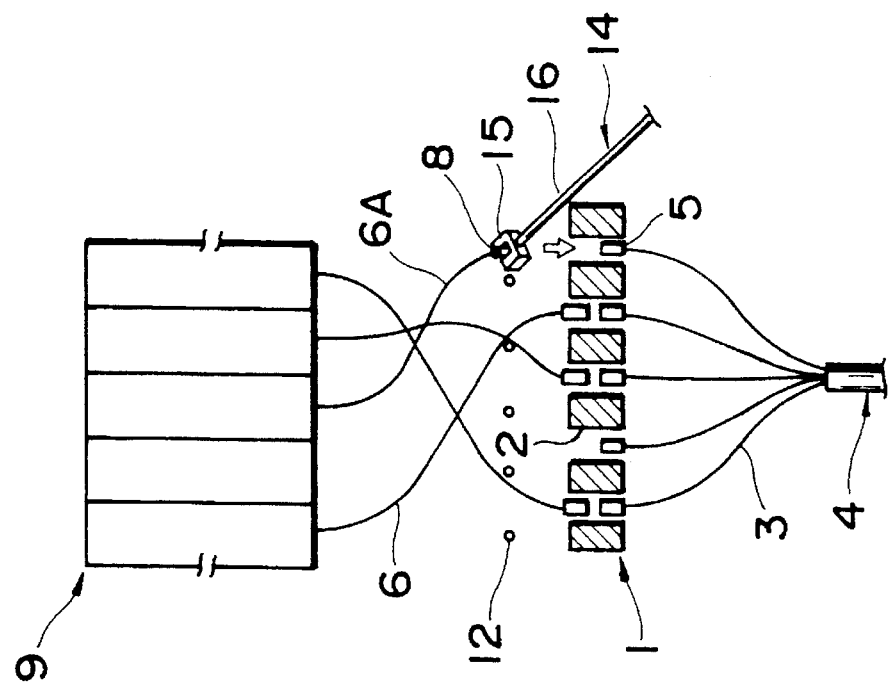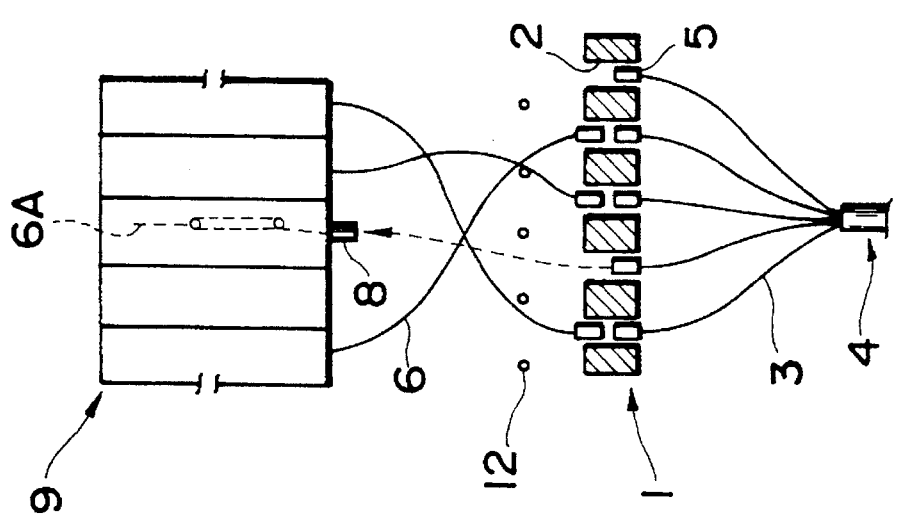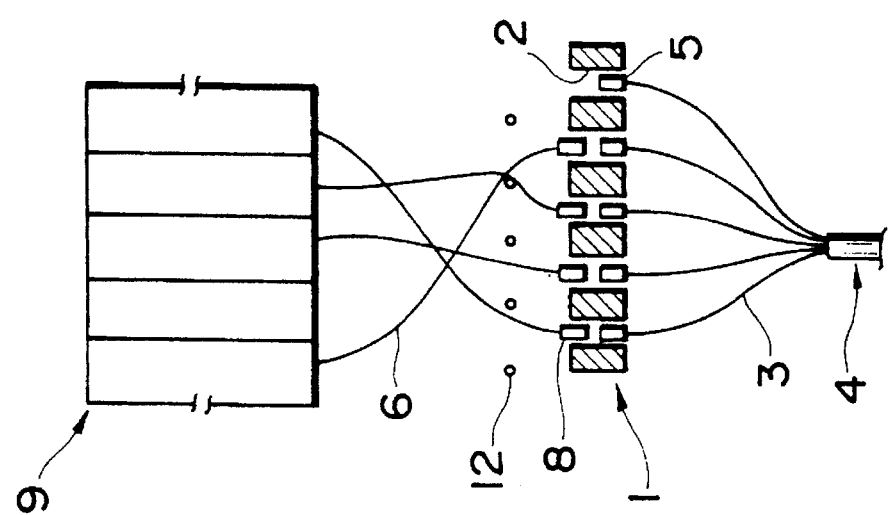

TRANSMISSION LINE SWITCHING APPARATUS

RELATED APPLICATIONS

This is a continuation-in-part of (1) application Ser. No. 08/022,641 filed on Feb. 25, 1993, now U.S. Pat. No. 5,386,485.

BACKGROUND OF THE INVENTION

1. Field of the Invention

This invention relates to a transmission line switching apparatus and method for selectively switching coupling between a plurality of first transmission lines and a plurality of second transmission lines which are respectively coupled with each other. In particular, the transmission line switching apparatus and method can be adapted to a switching apparatus of a communication network using (1) optical fibers being serving as a transmission path for optical signal, (2) electric wire serving as a transmission path for electric signal and the like.

2. Related Background Art

Recently there are found increasing developments in the field of optical communication. Taking into consideration the present circumstances that optical communication is introduced in main lines, it is urgently needed to make up large-scale wiring networks for coupling a number of optical fibers in matrix arrangements which are different from the conventional point-to-point relay transmission system.

A conventional optical fiber switching device comprises, although not illustrated here, a plurality of guide rails which are arranged perpendicular to each other, and slide terminals slidably mounted on the guide rails, and optical fibers respectively secured to the respective slide terminals, whereby the slide terminals are slid to couple required ones of the optical fibers (see "1×1000 Optical Switch for 10-Fiber Ribbon" Spring General Conference of The Institute of Electronics, Information and Communication Engineers (1989), ps. 4–238).

SUMMARY OF THE INVENTION

The present invention related to a transmission line switching apparatus comprising a coupling board for coupling a selected one of a plurality of first transmission lines to a selected one of a plurality of second transmission lines, the coupling board having a first surface connected to the plurality of first lines, and a second surface which opposes the first surface and is connected to the plurality of second lines. The first and second transmission lines are served as a transmission path used in a communication network; the transmission path includes (1) optical fibers being serving as a transmission path for optical signal, (2) electric wire serving as a transmission path for electric signal and the like.

The present invention further comprises adjusting means including a line length adjusting unit for handling surplus portions of the selected one of the plurality of second lines, partition means for dividing the second surface of the coupling board into a plurality of rows, and switching means for changing a connecting position of the selected one of the plurality of second lines to a desired position so that the selected one of the plurality of second lines can be connected with the selected one of the plurality of first lines by the coupling board.

The switching means includes a first robot mechanism disposed which is disposed proximate to the coupling board, the first robot mechanism comprising a pair of X-directional screw rods disposed in parallel with respect to each other and perpendicular with respect to the plurality of rows of the second surface of the coupling board, a pair of X-directional nuts, each x-directional nut being supported by one of the X-directional screw rods and being movable along the X-directional screw rod, a rotatable Z-directional screw rod disposed between the pair of X-directional screw rods, a Z-directional nut supported by the Z-directional screw rod and being movable along the Z-directional screw rod, an arm portion supported by the Z-directional nut and being movable in a vertical direction with respect to the Z-directional screw rod, and a hand portion provided on the arm portion for holding a part of the selected second line.

Furthermore, the switching means includes a second robot mechanism disposed which is disposed proximate to the coupling board, the second robot mechanism comprising a robot body engaged with the guide rail and being slidably movable along the guide rail, a first arm pivotally joined to the robot body and being capable of moving both upward and downward with respect to the first and second surfaces of the coupling board, a second arm pivotally joined to the first arm and being capable of moving both upward and downward with respect to the first and second surfaces of the coupling board, and a hand provided on the second arm so as to hold a portion of the selected one of plurality of second lines.

The present invention further comprises a controller for moving the movable arm portion in X-direction to a position where the arm portion is proximate to a selected one of the rows of the coupling board, the selected one of the rows having the selected one of the plurality of second lines therein, moving the movable arm portion in a Y-direction along the selected row of the coupling board until the movable arm is proximate to the selected second line, holding a part of the selected second line by the hand portion, moving the movable Z-directional nut so as to pull the selected second line in a Z-direction and thereby removing the selected second line from the coupling board, retreating the movable arm portion along the selected row, moving the movable arm portion in the X-direction to a desired one of the rows, moving the movable arm position in the Y-direction along the desired row until the desired position is reached, and moving the Z-directional nut in the Z-direction so as to connect the selected second line with the selected one of the first lines.

The coupling board may be made up a plurality of line holding units, each line holding unit being movable along the first and second surfaces of the coupling board In particular using the coupling board, the present invention further comprises slide means for selectively moving one of the line holding units along the first and second surfaces of the coupling board.

The present invention further comprises release means for allowing the selected one of second lines to be pulled out of the coupling board. Each of the release means comprises a connector hole recessed in the associated line holding unit, a release button being to both upward and downward and inserted in the connector hole, a flexible member inserted in the connector hole so that a part of the release button projects out of the surface of the line holding unit when the release button is pressed down by the switching means, a first-line connector disposed in the release button, for holding the associated first line, a sleeve holder removably covering an upper part of the first-line connector, for coupling the first line and a selected one of the plurality of second lines, and a ferrule chuck inserted in the release button and covering the sleeve holer, for holding the selected second line when the release button is pressed down. In particular, each of the ferrule chucks comprises a main body made of a flexible material and having an open bottom, the main body being defined by: a side wall of the main body split by the grooves for expanding and reducing a diameter of the insertion hole; and a slant portion formed on a lower peripheral surface of the main body.

The transmission line switching apparatus of the invention may includes gripping means for gripping a selected one of second lines fed from the adjusting means, and conveying means for operating the gripping means gripping the selected second line so that a surplus portion of the selected second line is smoothly housed in the associated line adjusting means. The gripping means comprises a plurality of drive pulleys rotatably mounted on a drive shaft in a number corresponding to a number of the second lines, a plurality of driven pulleys rotatably mounted on a driven shaft opposed to the respective drive pulleys, and springs disposed between the drive and the driven shafts for neighboring the drive pulleys and the driven pulleys, whereby each of the second optical fibers is gripped between the associated drive and driven pulleys. The conveying means comprises a main body engaged with a guide rail of the coupling box and being slidably movable along the guide rail, a pendant body vertically movably suspended from a plurality of guide rods pending from the main body through a spring, a roller accommodating recess formed in a part of the pendant body to be opposed to the drive pulleys, a roller disposed rotatably in the roller accommodating recess, for rotating the drive pulleys contacting the selected second line, and a constraining portion disposed on a part of the pendant body to be opposed to the drive pulleys, for contacting the drive pulley to the associated second line so as to constrain the rotation of the drive pulleys.

The partition means may be guide means provided in the coupling board, and the present invention further comprises guided means provided on the switching means and being displaceable along the guide means.

According to the present invention of this application having the above-described structure, the line length adjusting means handles unused portions of the second lines, such as optical fibers, wires and the like, to prevent the entanglement of the second lines. In addition, the partition means secure on the top surface (first surface) of the coupling board a plurality of spaces for the switching means to intrude into. As results, the disadvantages of great drops of the coupling operational efficiency and frequent occurrences of coupling errors can be prevented.

It is not necessary to secure a sufficiently large space for the coupling. As a result, the problem that adversely the device is accordingly large-sized can be solved.

According to the invention of this application having the above-described structure, the line length adjusting means handles unused portions of the second lines, and the second lines are prevented from entangling with one another (in the direction of the second surface of the coupling board) near the coupling board. A selected second line is taken up before the switching operation thereof to start its switching operation. A plurality of partition means divide and secure the top surface of the coupling board in a plurality of spaces for the switching means to be intruded into.

As results, the disadvantages that the coupling operational efficiency is much decreased, and erroneous coupling frequently occurs can be prevented, and a selected second line entangles with the other second lines with the result that the switching operation is made difficult can be solved.

Furthermore, the problem that the device as a whole adversely becomes large-sized can be solved.

According to the invention of this application having the above-described structure, a plurality of second lines in an arrangement are divided in rows, and a selected-one of the line holding units is displaced. As a result, the switching means can easier access to the second lines.

In addition, the switching means can make access to a selected one of the second lines without contacting to the other second lines. As a result, it is possible that the congestion of one line in coupling many of the lines can be effectively prevented.

According to the invention of this application having the above-described structure, as the release button is lowered, a force which has been acting radially inwardly on the side wall of the ferrule chuck is removed or weakened, and the ferrule chuck restores its original configuration. And the selected second line clamping state of the ferrule chuck is released.

As a result, the disadvantage that a selected second line is pulled out of the coupling board due to a cause, with the result that its coupling with a first line is released can be removed.

According to the invention of this application having the above-described structure, the switching means selects one of the second lines, and the conveying means functions for the selected second line to be taken up in the line length adjusting means, whereby the selected second line is automatically switched. As results, the switching operational efficiency is much improved, and the running costs can be lowered. In addition, the maintenance operational efficiency can be much improved.

Furthermore, the constraining means perfectly brakes the rotation of the rotary gripping means which grip those of the second lines which have not been selected. As a result, the non-selected second lines can be prevented without failure from damages.

According to the invention of this application having the above-described structure, the switching means is guided by the guide means in place of an operator to select one of the second lines and switch the same. As a result, it is possible to much improve the switching operational efficiency and maintenance operational efficiency.

In addition, it can be expected that in selecting a required one of the second lines and switching the same, the other second lines which have not been selected are prevented from damages without failure.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 shows a block diagram of a first embodiment of a robot mechanism used in the optical fiber switching apparatus shown in FIG. 1.

FIGS. 3–5 show views showing the operations of the controller of the optical fiber switching apparatus shown in FIG. 1.

DETAILED DESCRIPTION OF PREFERRED EMBODIMENTS

Figure 1:
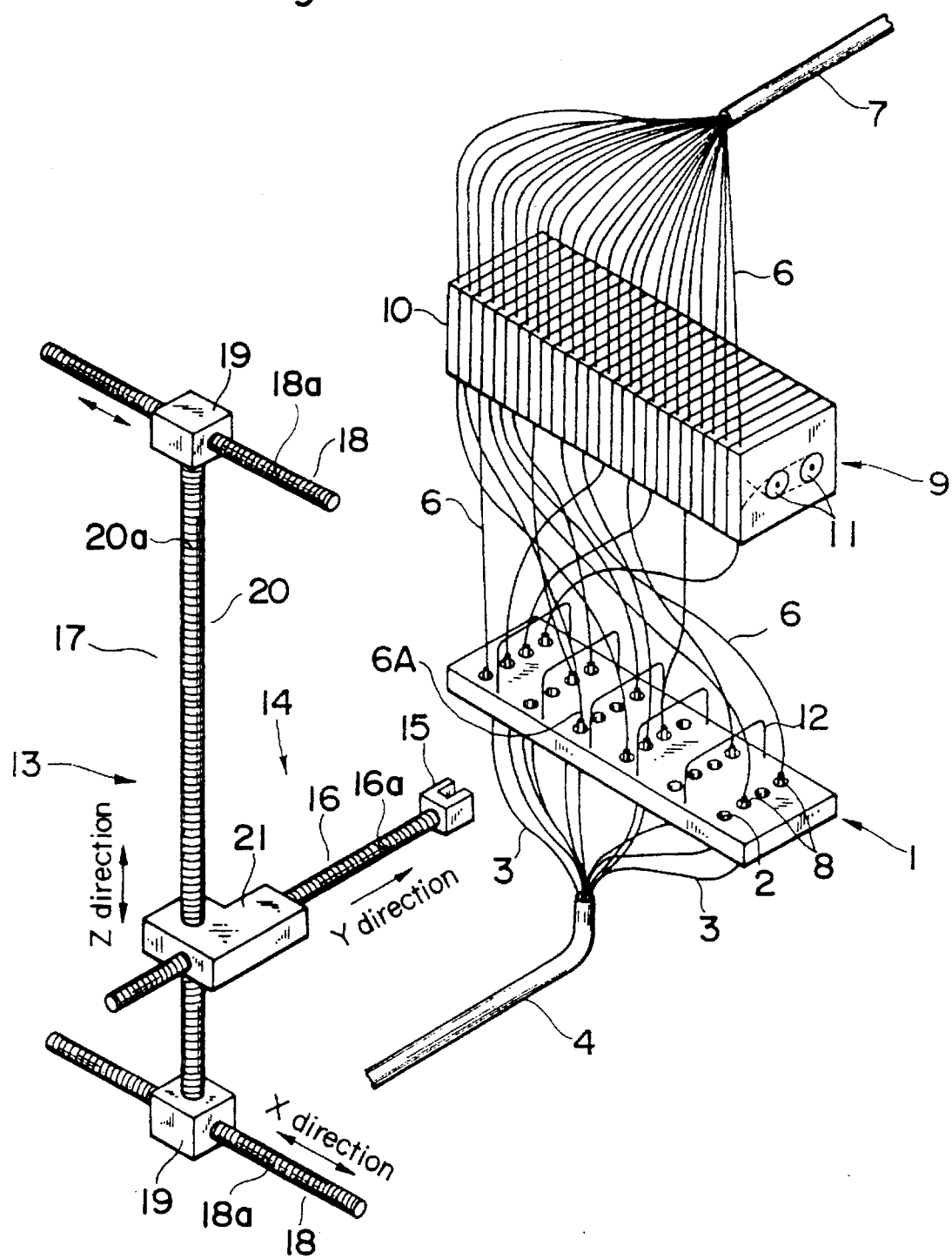
FIG. 1 shows a general perspective view of a first embodiment of the optical fiber switching apparatus according to the present invention.
Figure 6:
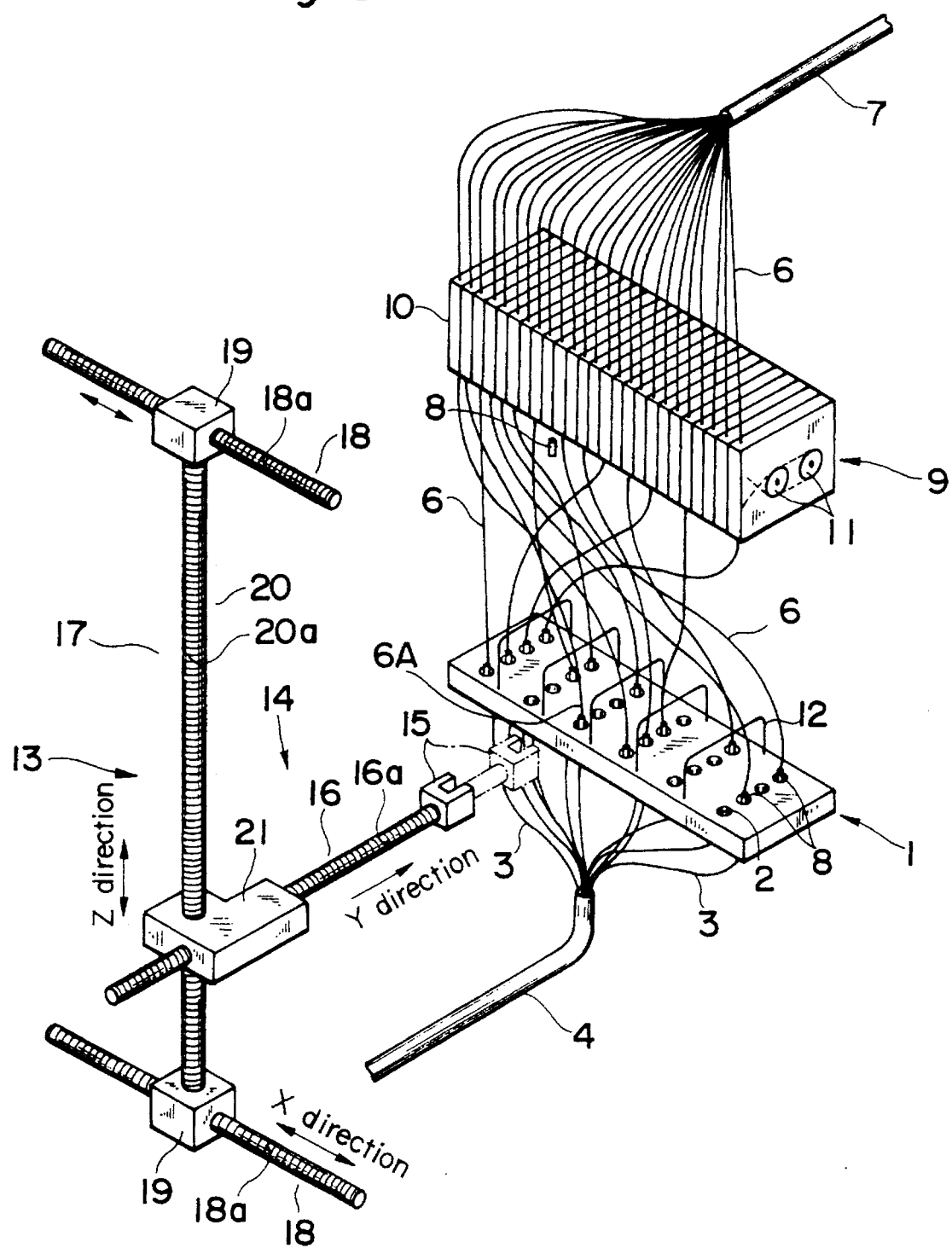
FIG. 6 shows a general perspective view explaining the first embodiment of the present invention shown in FIGS. 1–5.

A transmission line switching apparatus according to the present invention of this application will be explained by means of embodiments shown in FIGS. 1 to 24. In the following description common elements are represented by common reference numerals not to repeat their explanation. In these embodiments, the transmission line mainly means an optical fiber served as a transmission path for optical signal or a wire served as a transmission path for electrical signal.

The first embodiment of the optical fiber switching apparatus related to the invention, as shown in FIG. 1, comprises a coupling board 1 (included in coupling means), an optical fiber length adjusting unit 9 (included in adjusting means comprising a line length adjusting means), and partitioning rods 12 (included in partition means) and a robot mechanism 13 (included in switching means).

As shown in FIG. 1, the coupling board 1 is in the form of a substantially rectangular board and has a plurality of connector adaptor holes (adapted to be inserted connector) formed vertically therethrough in a matrix arrangement. Connector adaptors 2 for coupling are fit in the respective connector adaptor holes.

As shown in FIG. 1, the connector adaptors 2 are formed in a 6 rows×4 columns arrangement which holds first optical fibers in a 6 rows×4 columns matrix arrangement.

As shown in FIG. 1, the first optical fibers 3 are enveloped in a bundle by a first optical cable 4 which is positioned horizontal below the coupling board 1, are exposed out of the envelope at the open upper end thereof bent upward, and then are curved toward the coupling board.

The respective first optical fibers 3 have one ends inserted in connectors which are to be removably plugged from below into the connector adaptors 2. The respective connectors are plugged into or drawn out of the connector adaptors 2 by forces exerted in the directions of optical axes of the optical fibers.

As show in FIG. 1, the connection of the first optical fibers 3 to the connector adaptors 2 by the respective connectors brings the first optical fibers 3 into connection with a plurality of second optical fibers 6 to constitute a large scale of N×M optical switches.

The second optical fibers 6 are enveloped, as shown in FIG. 1, by a second optical cable 7 which is positioned horizontal above the coupling board 1, are exposed out of the open upper end of the second optical fiber 7, and are individually suspended, curved toward the coupling board 1.

As shown in FIG. 1, the second optical fibers 6 have the ends inserted in connectors 8 (second-line connectors) which are to be plugged into the connectors 8 from above. The connectors 8 are plugged into or drawn out of the connector adaptors 2 by forces exerted in the directions of optical axes of the second optical fibers 6.

When the connectors 8 of the second optical fibers 6 are coupled with the first optical fibers 3 as shown in FIG. 1, the lower part of the connectors 8 are in the coupling board 1 with the upper parts thereof exposed upward from the top surface of the coupling board 1.

The surface of each second optical fiber 6 and that of its connector 8 define a smooth and continuous surface without any step which hinders the disconnection of the second optical fiber 6.

Thus, the second optical fibers 6 are individually suspended from the second optical cable 7 through the optical fiber length adjusting unit 9, and when the connectors 8 are plugged into the connector adaptors 2, the second optical fibers 6 are coupled with the first optical fibers 3.

As shown in FIG. 1, the optical fiber length adjusting unit 9 comprises a plurality of optical fiber length adjusting blocks 10 of rectangular section which are laid on each other in the horizontal direction each with the largest sides set upright so as to make up a rectangular parallelopiped, and is horizontally positioned substantially directly above the coupling board 1.

A pair of rotatable reels 11 is provided in each optical fiber length adjusting block 10. The rotatable reels 11 of each pair are urged separate from each other by, e.g., a spring. Parts of the second optical fibers, i.e., unused portions of the second optical fibers 6, are wound on their associated pair of reels 11.

The springs have a spring constant for generating a force in the Z-directional which is smaller than forces for connecting the connectors to couple the first and the second optical fibers 3, 6, so that the spring force can prevent the disconnection of the connectors.

When a second optical fiber 6 is payed out, the optical fiber length adjusting unit 9 rotates the associated reels 11 and downwardly pays out a required length of the second optical fiber 6, so that the length of the second optical fiber 6 is adjusted for the prevention of the entanglement of the second optical fiber from the other second optical fibers on the coupling board 1.

The second optical fibers 6 are straight or curved near the underside of the optical fiber length adjusting unit 9.

Five partition rods 12 are inserted in the top surface of the coupling board 1 so as to divide the connector adaptors into six rows, i.e., the first optical fibers 3 in six rows.

Each partition rod 12 has the shape of a bracket sign as shown in FIG. 1, and both legs of the bracket-shaped rod 12 are inserted in a substantially downward U-shape respectively in holes formed in the coupling board 1 respectively near the first column and the fourth column.

Accordingly the top surface of the coupling board is divided in 6 rows by the five partition rods 12, and six spaces into each of which a robot hand 14 of a robot mechanism 13 can horizontally intrude from the slant left to the slant right as viewed in FIG. 1 are secured.

As shown in FIG. 1, the robot mechanism 13 comprises the robot handle 14, a driving mechanism 17, a hand portion 15 of a structure which allows the connectors 8 exposed upward from the top surface of the coupling board 1 (e.g., a hand in the form of a substantially U-shaped member A), and an arm portion 16 which is movable forward and backward and has the hand portion 15 on the forward end.

The arm portion 16 is provided by a round rod, and a screw groove 16a is formed in the outer periphery of the round rod member.

The driving mechanism 17 comprises a pair of X-directional screw rods 18 which are rotatably arranged horizontal, a pair of X-directional nuts 9 screw-engaged respectively on the pair of X-directional screw rods 19, a Z-directional screw rod 20 which is rotatably supported vertical between the pair of X-directional nuts 19, and a Z-directional nut 21 of substantially L-shaped cross-section which is screw-engaged with the Z-directional screw rod 20 and supports the arm portion 16 horizontal. Both the X-directional screw rods 18 and the Z-directional screw rod 20 are respectively formed screw grooves 18a and 20a on the outer periphery thereof.

The X-directional screw rod 18 and the Z-directional screw rod 20 are rotatable independently of each other. The rotation of the X-directional rod 18 moves the robot hand 14 in the X direction, and the rotation of the Z-directional screw rod 20 moves the robot hand 14 up and down in the Z direction.

The Z-directional nut 21 has a conversion mechanism for changing rotary motion into reciprocating motion(e.g., a motor, worm gear or others) built in, and the operation of this conversion mechanism moves the arm portion 16 by a required length forward in the Y direction.

The rotating force of the Z-directional screw rod 20 is so set that a Z-directional force larger than at least a connection force between the connectors 5 (first-line connector) of the first optical fibers 3 and the connectors 8 (second-line connector) of the second optical fibers 6 can be produced, whereby the lock of the connector can be sufficiently released.

The robot mechanism 13 is controlled by a controller 200. The controller 200 controls the Z-directional nut 21 as a Y-directional driver, an X-directional driver 131 and a Z-directional driver 132 by receiving control signals from communication system 300. The Z-directional nut 21 carries out a movement of the Y direction; the X-directional driver 131 carries out a movement of the X direction; the Z-directional driver 132 carries out a movement of the Z direction.

Next the operation of the optical fiber switching apparatus according to this embodiment will be explained.

In releasing the lock between the connectors of a first optical fiber 3 and of a required second optical fiber 6A which are optically coupled to each other, first the X-directional screw rod 18 and the Z-directional screw rod 20 are respectively rotated to move the robot hand 14 toward a required row the required second optical fiber 6A belongs to.

Then the pair of X-directional nuts 19, and the Z-directional nut 21 are guided accurately in the same direction respectively by the X-directional screw rod 18 and the Z-directional screw rod 20 to position the robot hand 14 at the required row on the coupling board 1.

When the robot hand 14 is positioned at the required row, the motor in the Z-directional nut 21 is actuated to move the arm portion 16 in the direction of the required rows.

Since the spaces between the respective rows and their adjacent one have been cleared of any obstacle, the move of the robot hand 14 is never hindered by the other second optical fibers 6. In this operation, the robot hand 14 is moved forward over the top surface of the coupling board 1 along the required row and brings the hand portion 15 near to the connector 8 of the required second optical fiber 6A to be switched.

When the hand portion 15 is brought near to the required connector 8 to be switched, the hand portion 15 holds the connector 8 of the required second optical fiber 6A and is moved upward from the top surface of the coupling board 1 to release the lock of the connectors.

At this time the hand portion 15 can hold and smoothly pull out the connector 8 of the required second optical fiber 6A because the surface of the required second optical fiber 6A and that of its connector 8 are formed so as to define a smoothly continuous surface of a small frictional coefficient without any step when both are assembled.

When the lock of the connectors is thus released, the motor in the Z-directional nut 21 is again actuated to return the arm portion 16 to its original position along the required row.

When the arm portion 16 arrives at its original position, the X-directional screw rod 18 and the Z-directional screw rod 20 are again rotated so that the robot handle 14 is moved toward a required row a required first optical fiber 3 belongs to.

Then the pair of X-directional nuts 19 and the Z-directional nut 21 are guided accurately in the same direction respectively by the pair of X-directional nuts 19 and the Z-directional nut 21, and the robot handle 14 is positioned on the required row on the coupling board 1.

When the robot hand 14 is positioned at the required row on the coupling board 1, the motor in the Z-directional nut 21 is again actuated to move the arm portion 16 forward in the direction of the rows of the second optical fibers 6.

Since the spaces between the respective rows and its adjacent one have been cleared of any obstacle as described above, the move of the robot hand 14 is never hindered by the second optical fibers 6. In this operation, the robot hand 14 is moved forward over the top surface of the coupling board 1 and brings the hand portion 15 near to the connector adaptor of the required first optical fiber 3 to receive the required second optical fiber 6A.

When the hand portion 15 is brought near to the required connector adaptor 2 to receive the required second optical fiber 6A, the hand portion 15 connects and locks the connector 8 of the required second optical fiber 6A to the connector adaptor 2 of the required first optical fiber 3, and a switching operation is completed.

In such arrangement, the optical fiber length adjusting unit 9 handles unused portions of the second optical fibers 6 for the prevention of the entanglement of the second optical fibers 6 on the coupling board 1, and the partitioning rods 12 secure the spaces on the top surface of the coupling board 1 for the robot hand 14 to smoothly intrude into.

As results, it can be prevented that the second optical fibers 6 gather on the top surface of the coupling board 1 to adversely much lower the coupling operation of the optical fibers and to cause frequent coupling errors.

Furthermore, the disadvantage that when one slide terminal is switched to another slide terminal, the congestion of the optical fibers is always a serious problem can be prevented.

Furthermore, since large spaces are not necessary for coupling the optical fibers on the top surface of the coupling board 1, the problem of unpreferable large-sizes of the device as a whole can be prevented.

In this embodiment, the partition rods 12 have a bracket sign shape, but their shape is not limited to the shape and may have plate shapes or other shapes.

Then another operation of the optical fiber switching apparatus of the invention will be explained by using FIGS. 3, 4 and 5, and FIG. 6. Common elements have common reference numerals not to repeat their explanation.

The operation of the optical fiber switching apparatus according to this embodiment is conducted in the same apparatus, as the apparatus shown in FIG. 1, comprising the coupling board 1, the optical fiber length adjusting unit 9, the partition rods 12, and the robot mechanism, but is different from the method conducted in the device according to the first invention in the operation of switching the optical fibers.

Then the operation of the optical fiber switching apparatus according to this embodiment will be explained. First, a pair of reels 11 accommodated in the optical fiber length adjusting unit 9 is forcedly rotated to take up a required second optical fiber 6A in a direction substantially perpendicular to the top surface of the coupling board 1, so that the lock between a first optical fiber 3 and the required second optical fiber 6A which are optically coupled with each other is forcedly released (see FIG. 3).

The required second optical fiber 6A released from the lock between the connectors is taken up in the optical fiber length adjusting unit 9 to position the connection 8 associated with the required second optical fiber 6A pendently on the underside of the optical fiber length adjusting unit 9 (see FIG. 4).

At this time, because of the partition rods 12 on the coupling board 1, the required optical fiber 6A can be taken up into the optical fiber length adjusting unit 9 without gathering with or entangling with the other second optical fibers 6.

Subsequently to locate the robot hand 14 at a required position, the X-directional screw rod 18 and the Z-directional screw rod 20 are respectively rotated. When the robot hand 14 is located at the required position, the motor in the Z-directional nut 21 is rotated to move forward along the taken up second optical fiber 6A.

The robot hand 14 intrudes horizontally into a required row in a direction perpendicular to the required row, and in addition the required second optical fiber 6A is fed out of its associated one of exits (not shown) formed in one row in the underside of the optical fiber length adjusting unit 9, so that the robot hand 14 can easily arrive at the required optical fiber 6A without colliding with the other second optical fibers 6.

when the robot hand 14 holds the required second optical fiber 6A, as the arm portion 16 is returning, the robot hand 14 returns in the Y direction, pulling the required second optical fiber 6A to return to its original position.

When the arm portion 16 arrives at its original position, the X-directional screw rod 18 and the Z-directional screw rod 20 are again rotated to move the robot hand 14 toward a required row a required first optical fiber 3 belongs to.

Then the pair of X-directional nuts 19 and the Z-directional nut 21 are guided accurately in the same direction respectively by the X-directional screw rod 18 and the Z-directional screw rod 20 to position the robot hand 14 at the required row on the coupling board 1.

When the robot hand 14 is positioned at the required row on the coupling board 1, the motor in the Z-directional nut 21 is again actuated to move the arm potion 16 forward in the direction of the rows of the second optical fibers 6.

Since the spaces between the respective rows and their adjacent ones has been cleared of any obstacle, the move of the robot hand 14 is never blocked. In this operation, the robot hand 14 is moved forward over the top surface of the coupling board 1 in the direction of the rows of the second optical fibers 6 to bring the hand portion 15 near to the connector adaptor 2 associated with the required first optical fiber 3 for the required second optical fiber 6A to be switched to.

When the hand portion 15 is brought near to the connector adaptor 2 for the required second optical fiber 6A to be switched to, the hand portion 15 connects the connector 8 of the required second optical fiber 6A to the connector adaptor 2 holding the connector 5 of the required first optical fiber 3 and lock both connectors, and the switching operation is completed (see FIG. 5).

In this embodiment, the optical fiber length adjusting unit 9 adjusts lengths of the second optical fibers 6 to prevent the second optical fibers 6 from gathering on the coupling board 1, while in the switching operation, a required second optical fiber 6A is taken up to prevent the required second optical fiber 6A from entangling with the other optical fibers 6.

The partition rods 12 define and secure on the coupling board 1 the spaces for the robot hand 14 to smoothly intrude into.

Accordingly it can be prevented that the second optical fibers 6 gather on the top surface of the coupling board 1 to adversely much lower the coupling operation of the optical fibers and to cause frequent coupling errors.

A disadvantage that a required second optical fiber 6A droops to entangle with the other second optical fibers 6 with a result that the switching operation is made very difficult can be solved.

The disadvantage that when one slide terminal is switched to another slide terminal, the congestion of the optical fibers is always a serious problem can be prevented.

Since large spaces are not necessary for coupling the optical fibers through the coupling board 1, the disadvantage of unpreferable large-sizes of the device as a whole can be prevented.

In this embodiment, the partition rods 12 are provided on the top surface of the coupling board 1, but the partition rods 12 may be omitted.

The connection of the first optical fibers 3 held in the coupling board 1 with the second optical fibers 6 is not essentially by the connectors, and the same function and effects as produced by this embodiment can be produced by the ON/OFF mechanisms or others of known automatic lock means built in the coupling board 1.

Figure 7:
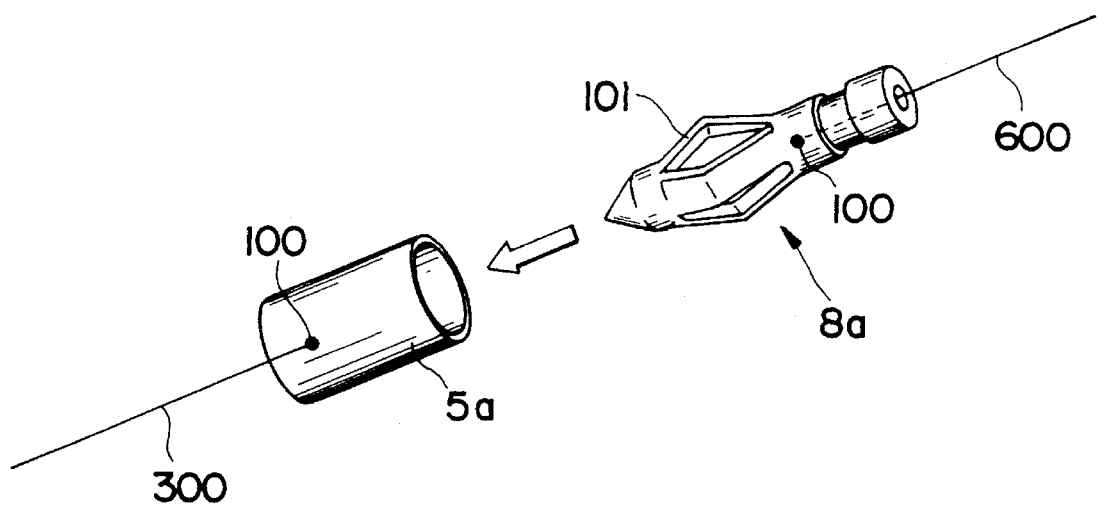
FIG. 7 shows a general perspective view of connectors of the wire switching apparatus according to the present invention.
Figure 8:
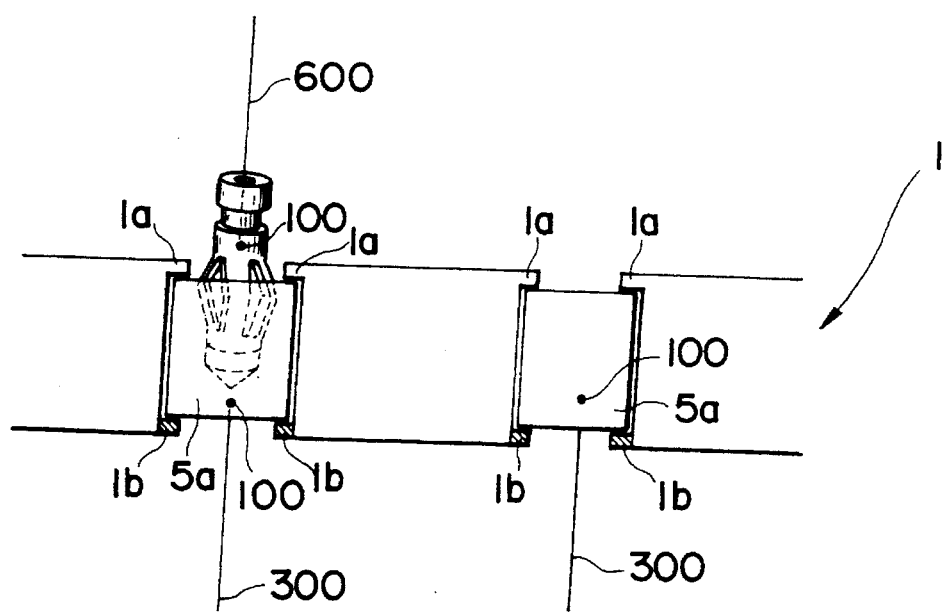
FIG. 8 shows a vertical sectional view of the coupling board of the wire switching apparatus according to the present invention.

The transmission lines, as objects for being connected by the apparatus of the invention, is not limited an optical fiber. The transmission line may be wire served as a transmission path for electrical signal. FIG. 7 shows the connection structure between the first wire 300 (first transmission line) and the second wire 600 (second transmission line). A first plug 5a is made of a metal and is electrically joined to the first wire 300 through a solder or calking 100. A second plug 8a is made of a metal and is electrically joined to the second wire 600 through a solder or calking 100. In particular the second plug 8a has a elastic structure 101 at the side surface thereof. Each of the first plugs 5a is inserted in the connecter adapter 2 of the coupling board 1 and is fixed fixing members 1b and projections 1a. The robot mechanism 13 connects the required wire 600 to the associated first wire 300 by joining the second plug 8a to the first plug 5a.

Figure 9:
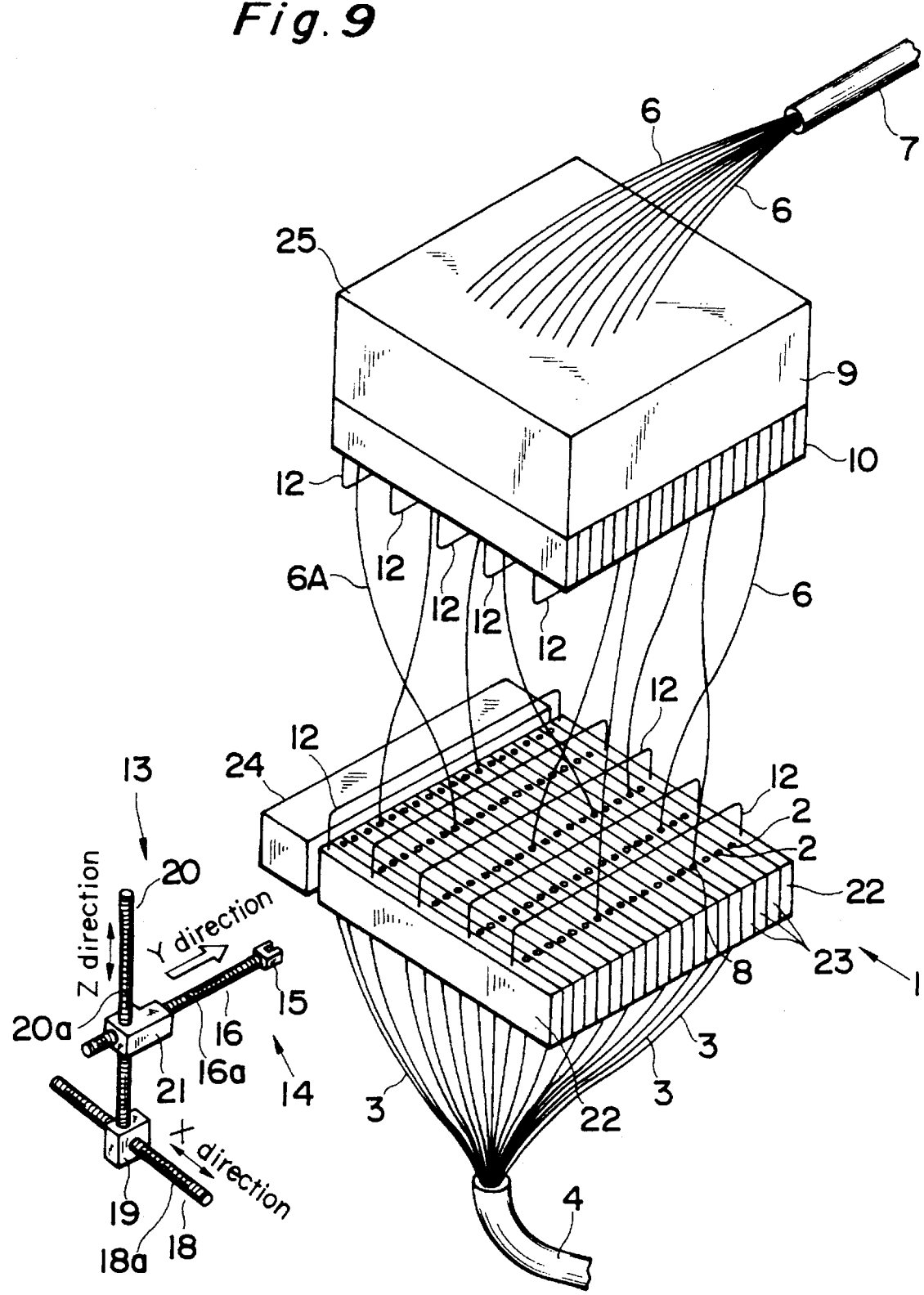
FIG. 9 shows a general perspective view of a second embodiment of an optical fiber switching apparatus according to the present invention.
Figure 10:
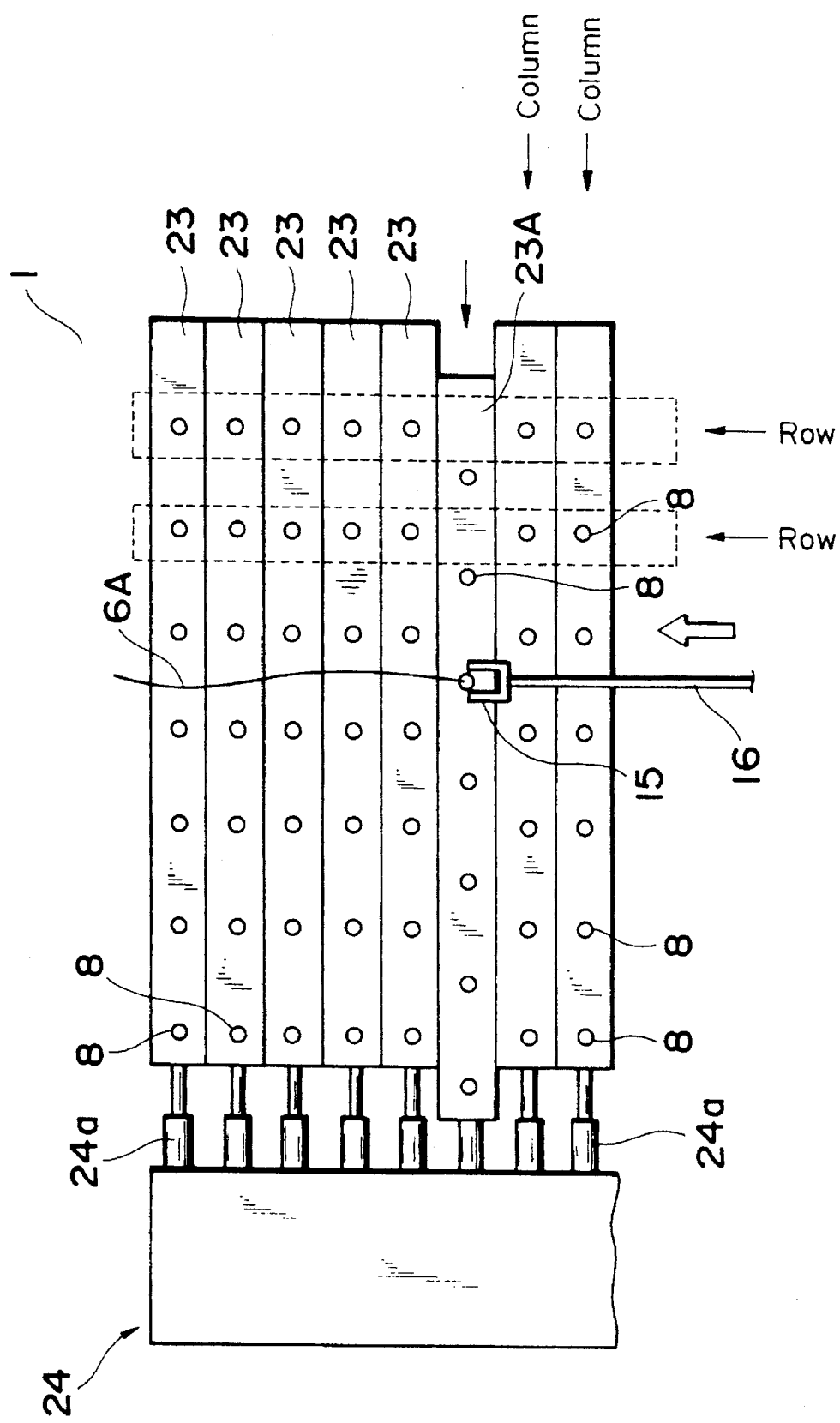
FIG. 10 shows a plan view explaining an access of a robot hand of a second embodiment.

A second embodiment of the optical fiber switching apparatus according to the present invention, as shown in FIGS. 9 and 10, will be explained. Common elements have common reference numerals not to repeat their explanation.

As shown in FIG. 9, the optical fiber switching apparatus according to the second invention comprises a coupling board 1 in the form of a matrix board, an optical fiber length adjusting unit 9, partition rods 12, a robot mechanism 13 and a solenoid mechanism 24.

As shown in FIG. 9, the coupling board 1 comprises a pair of plates 22 opposed to each other with a space therebetween a plurality of optical fiber holding units 23 disposed between the pair of plates 22 and each holding in one row a plurality of first optical fibers 3 and a plurality of second optical fibers 6. The pair of plates 22 and the optical fiber holding units 23 constitute a block of generally rectangular section.

Each of the optical fiber holding units 23 has a plurality of connector adaptor holes (not shown) formed vertically therethrough at a certain interval, and connector adaptors 2 for the coupling of the second and the third optical fibers 3, 6 are fitted in the holes. Each of the first optical fibers 3 are received in the connector adaptors 2 from below.

The optical fiber holding units 23 are laid on each other in the direction (Y direction) perpendicular to the direction (X direction) of arrangement of the respective optical fiber holding units 23. The respective connector adaptors 2 are movable in the direction of arrangement of the respective optical fiber holding units 23.

Insertion holes for the partition rods 12 are formed in the top surface of the pair of plates 22 at a certain interval. Each partition rod 12 has both legs inserted respectively in the associated ones of the holes over the optical fiber holding units 23.

As shown in FIG. 9, each partition rod 12 has a bracket-sign shape and is inserted downward in the associated holes with the horizontal part thereof positioned very above the associated connector adaptors 2 in a row extending in the Y direction.

Accordingly the top surface of the coupling board 1 is divided in five spaces by the partition rods 12, and at least five spaces into each of which a robot hand 14 of a robot mechanism 13 can intrude from the slant left to the slant right as viewed in FIG. 9 are secured.

A solenoid mechanism 24 of a substantially rectangular parallelopiped for displacing a required optical fiber holding unit 23 by a required amount in the X direction is juxtaposed with one side of the coupling board 1.

As shown in FIG. 10, the solenoid mechanism 24 includes a plurality of reciprocable levers 24a provided on the side opposed to said one side of the coupling board 1 at positions corresponding to the optical fiber holding units 23. Each lever 24a is connected to each optical fiber holding unit 23.

As shown in FIG. 10, the solenoid mechanism 23 pulls, based on an applied voltage, the lever 24a of a selected one of the optical fiber holding units 23 to the left as viewed in FIG. 10, so that the connector adaptors 2 of the selected optical fiber holding unit 23 are displaced by a distance ½ the interval between the respective connector adaptors 2 and their adjacent ones in the same unit 23.

As shown in FIG. 10, this displacement brings only the connector adaptors 2 in the optical fiber holding units 23 displaced by the solenoid mechanism 24 into paths for the robot hand 14 to intrude into. As results, without turning a wrist portion, the robot hand 14 can easily make an access to and hold a required one of second optical fibers 6.

As shown in FIG. 9, the optical fiber length adjusting unit 9 comprises a plurality of optical fiber length adjusting blocks 10 horizontally laid on each other with the larger sides upright, a single storage 25 mounted on the top surfaces of the optical fiber length adjusting blocks 10. The optical fiber length adjusting unit 9 has a substantially rectangular parallelopiped and is mounted horizontally very above the coupling board 1.

Each of the optical length adjusting blocks 10 has a pair of rotatable reels 11 urged separate from each other by, e.g., a spring. A part of the associated second optical fiber 6 is wound on each pair of reel 11.

The springs are given a spring constant which generates a Z-directional force smaller than a connection force of the connectors 5, 8 of the first and the second optical fibers 3, 6 for coupling the first and the second optical fibers 3, 6, whereby the spring force can prevent the release of the connection between the connectors 5, 8.

Insertion holes for the partition rods 12 are formed in both end portions of the underside of the optical fiber length adjusting unit 10 at a certain interval. Each partition rod 12 is inserted horizontally pendant in those of the insertion holes opposed to each other.

As described above, each partition rod 12 has a substantially bracket-sign shape and is suspended with the horizontal part thereof positioned lower and extended in the Y direction.

Accordingly the partition rods 12 divide the undersides of the optical fiber length adjusting blocks 10 in at least five spaces, so that the second optical fibers 6 never entangle with one another near the undersides of the optical fiber length adjusting blocks 10.

The storage 25 has a box-shape of rectangular cross-section and keeps drooped unused portions of the second optical fibers 6.

When the second optical fibers 6 are drawn out, the optical fiber length adjusting unit 9 rotates the reels 11 to pay out downward necessary lengths of the second optical fibers 6, whereby unused portions of the second optical fibers 6 are handled to prevent the entanglement of the second optical fibers 6 on the coupling board 1. The other parts are the same as that of the apparatus shown in FIG. 1.

Next, the operation of the optical fiber switching apparatus according to this embodiment will be explained.

In releasing the lock of a first optical fiber 3 and a required second optical fiber 6A which are optically coupled with each other, first the X-directional screw rod 18 and the Z-directional screw rod 20 are respectively rotated to move the robot hand 14 to a pace adjacent to a row the required second optical fiber 6A belongs to.

The X-directional nut 19 and the Z-directional nut 2 are guided by the X-directional screw rod 18 and the Z-directional screw rod 20, which are on rotation, accurately in the same direction to position the robot hand 14 in a space adjacent to the required row on the coupling board 1.

When the robot hand 14 is positioned in the space adjacent to the required row on the coupling board 1, the motor housed in the Z-directional nut 21 is actuated to move forward the arm portion 16 in the direction of the required row the required second optical fiber 6A belongs to.

Since the spaces between the respective rows and their adjacent one have been cleared of any obstacle, the move of the robot hand 14 is never hindered by the other second optical fibers 6. In this operation, the robot hand 14 is moved forward over the top surface of the coupling board 1 along the required row and brings the hand portion 15 near to the connector 8 of the required second optical fiber 6A to be switched.

At this time, based on an applied voltage the solenoid mechanism 24 pulls to the left as viewed in FIG. 10 the lever 24a associated with the optical fiber holding unit 23 the required second optical fiber 6A belongs to, and the connector adaptors 2 of the optical fiber holding unit 23 are replaced by a distance ½ the interval between the respective connector adaptors 2 and their adjacent ones.

This displacement brings only the connector adaptors 2 of the optical fiber holding unit 23 in the paths for the robot hand 14 to intrude into. As results, the robot hand 14 can easily make access and hold the required second optical fiber 6A.

When the robot hand 14 is position near the connector 8 to be switched, the hand portion 15 holds the connector 8 of the required second optical fiber 6A and is moved upward in the Z direction from the top surface of the coupling board 1, and the lock of the connector 8 is released.

Since the surfaces of the connector 8 and those of the second optical fibers 6 define a smooth continuous surface with a small friction coefficient and, in addition, without any step, the robot hand 14 can hold and pull out the connector 8 of the required second optical fiber 6A.

When the lock of the connectors 5, 8 is thus released, the motor in the Z-directional nut 21 is again actuated to return the arm portion 16 to its original position in the direction of the row of the required second optical fiber 6A.

Then, based on an applied voltage the solenoid mechanism 24 returns the lever 24a of the optical fiber holding unit 23 the required second optical fiber 6A belongs to the right as viewed in FIG. 10, so that the connector adaptors 2 of the optical fiber holding unit 23 is replaced by the ½ distance back to its original position.

When the arm portion 16 is positioned at its original position, the X-directional screw rod 18 and the Z-directional screw rod 20 are again rotated to move the robot hand 14 toward the row a required first optical fiber 3 belongs to.

Then the X-directional nut 19 and the Z-directional nut 21 are guided respectively by the X-directional screw rod 18 and the Z-directional screw rod 20 accurately in the same direction to position the robot hand 14 at the required row on the coupling board 1.

When the robot hand 14 is positioned at the required row on the coupling board 1, the motor in the Z-directional nut 21 is again actuated to move forward the arm portion 16 in the direction of the second optical fibers 6.

Since the spaces between the respective rows and their adjacent ones has been cleared of any obstacle as described above, the move of the robot hand 14 is never blocked. In this operation, the robot hand 14 is moved forward over the top surface of the coupling board 1 in the direction of the rows of the second optical fibers 6 to bring the hand portion 15 near to the connector adaptor 2 associated with the required first optical fiber 3 for the required second optical fiber 6A to be switched to.

At this time, based on an applied voltage the splenoid mechanism 24 pulls the lever 24a associated with the optical fiber holding unit 23 the required first optical fiber 3 belongs to the left as viewed in FIG. 10, so that the connector adaptors 2 of the optical fiber holding unit 23 are replaced by a distance ½ the interval between the respective connector adaptors 2 and their adjacent ones.

This displacement brings only the connector adaptors 2 held on the optical fiber holding unit 23 into the paths of the robot hand 14. As results, the robot hand 14 can easily make access and hold the required second optical fiber 6A.

When the hand portion 15 approaches the connector adaptor 2 for the required second optical fiber 6A to be switched to, the hand portion 15 connects the connector 8 of the required second optical fiber 6A to the connector adaptor 2 of the required first optical fiber 3 for the lock of the connector 5, 8, and the switching operation is completed.

Since in the above-described arrangement the partition rods 12 secure on the top surface of the coupling board 1 the spaces for the robot hand 14 to smoothly intrude into, disadvantages that the second optical fibers 6 gather on the top surface of the coupling board 1 to much lower the operation of coupling the optical fibers or to cause frequent occurrences of coupling errors can be prevented.

Furthermore, the disadvantage that when one slide terminal is switched to another slide terminal, the congestion of the optical fibers is always a serious problem can be prevented.

Furthermore, since large spaces are not necessary for coupling the optical fibers on the top surface of the coupling board 1, the disadvantage of unpreferable large-sizes of the device as a whole can be prevented.

Furthermore, since only a selected optical fiber holding unit 23 is displaced into the paths for the robot hand 14 to intrude into, the robot hand 14 can very easily hold a connector 8.

Furthermore, since the robot mechanism 13 can be made compact, it can be expected that the robot mechanism 13 can be small-sized. It can be realized by this compaction to make the coupling board 1 denser.

In this embodiment the partition rods 12 are used, but instead plate members or others may be used. The slide means is not necessarily the solenoid mechanism 24 and can be, e.g., an assembly of a rack and pinion, a motor, etc.

The optical fiber holding units 23 may be arranged to be pushed out still with the same functional effect as in this embodiment achieved.

Subsequently a third embodiment of the optical fiber switching apparatus according to the present invention will be explained.

Figure 11:
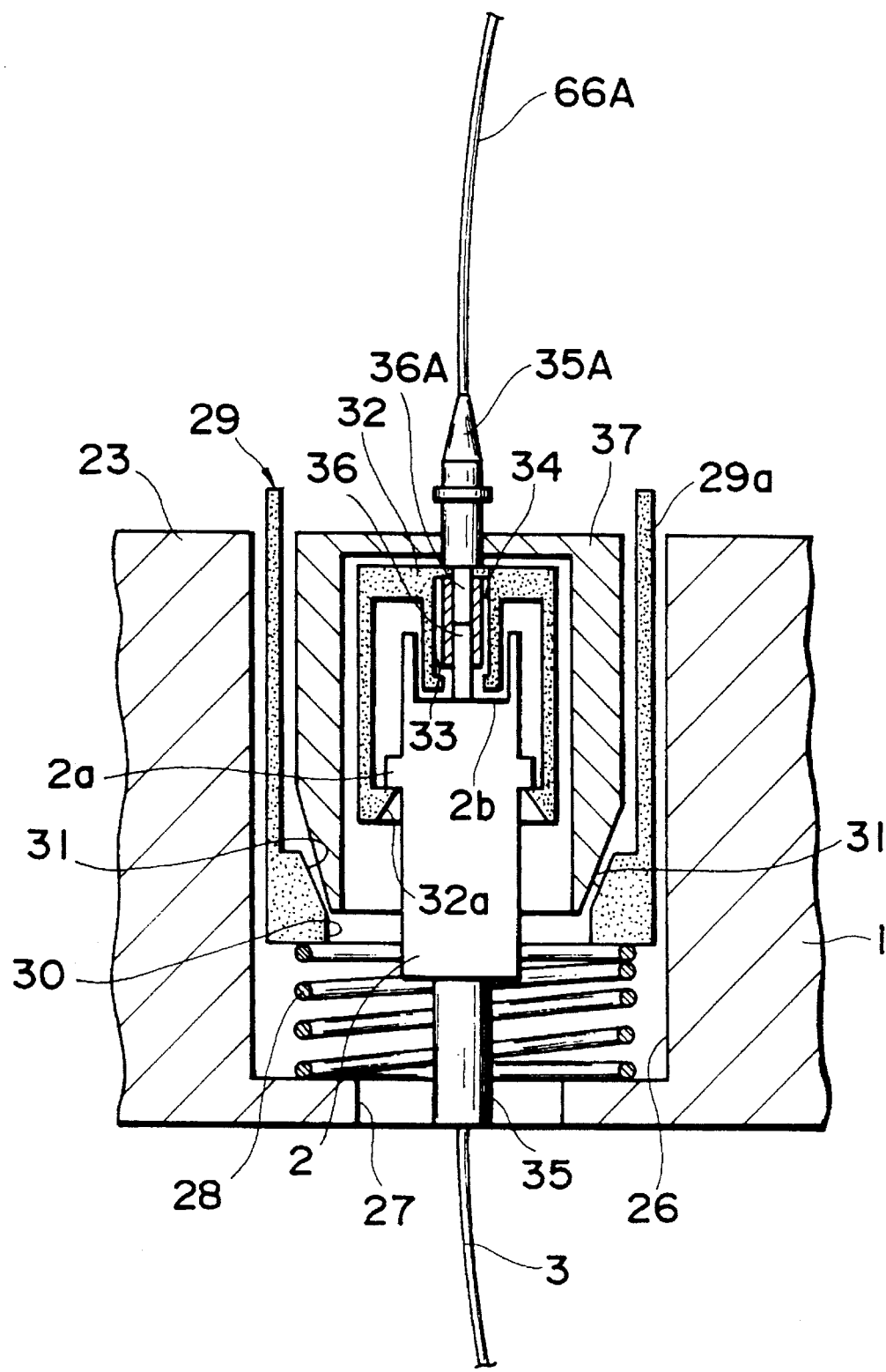
FIG. 11 shows a vertical sectional view of a major part of an optical fiber switching apparatus according to a third embodiment of the present invention.
Figure 12:
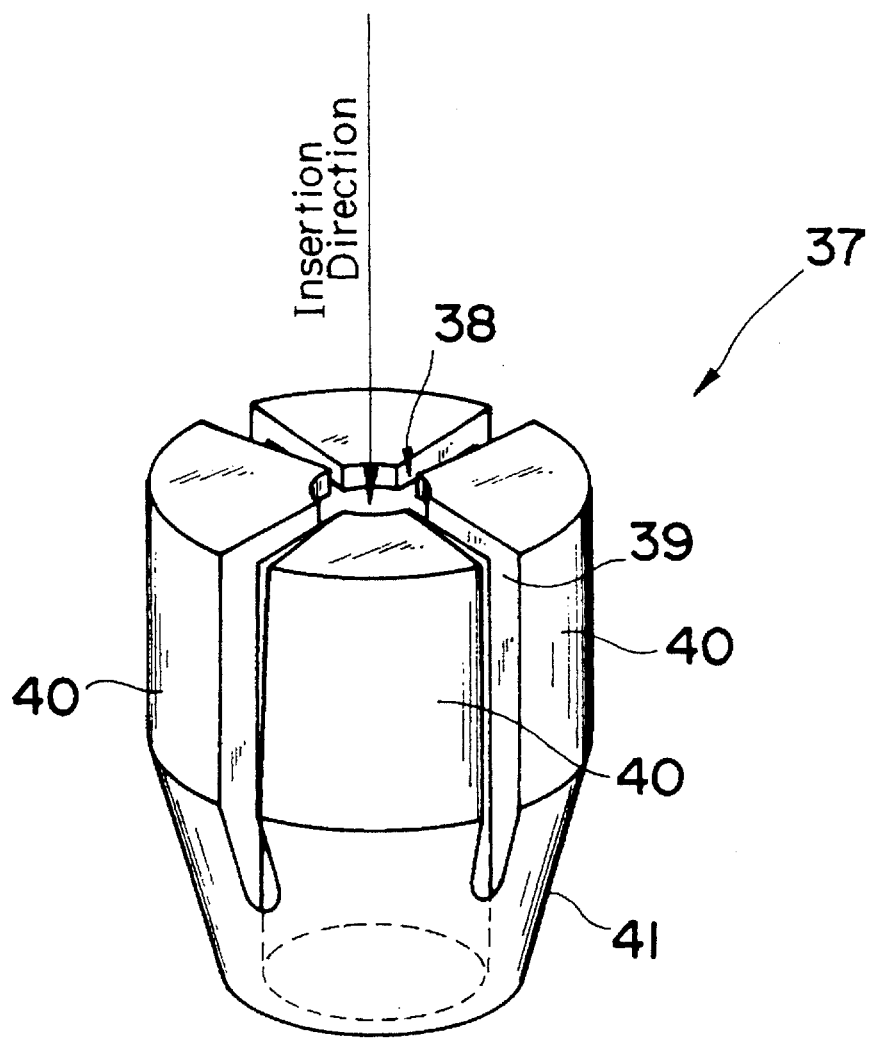
FIG. 12 shows a perspective view of an appearance of a ferrule chuck used in the optical fiber switching apparatus according to the third embodiment.
Figure 13:
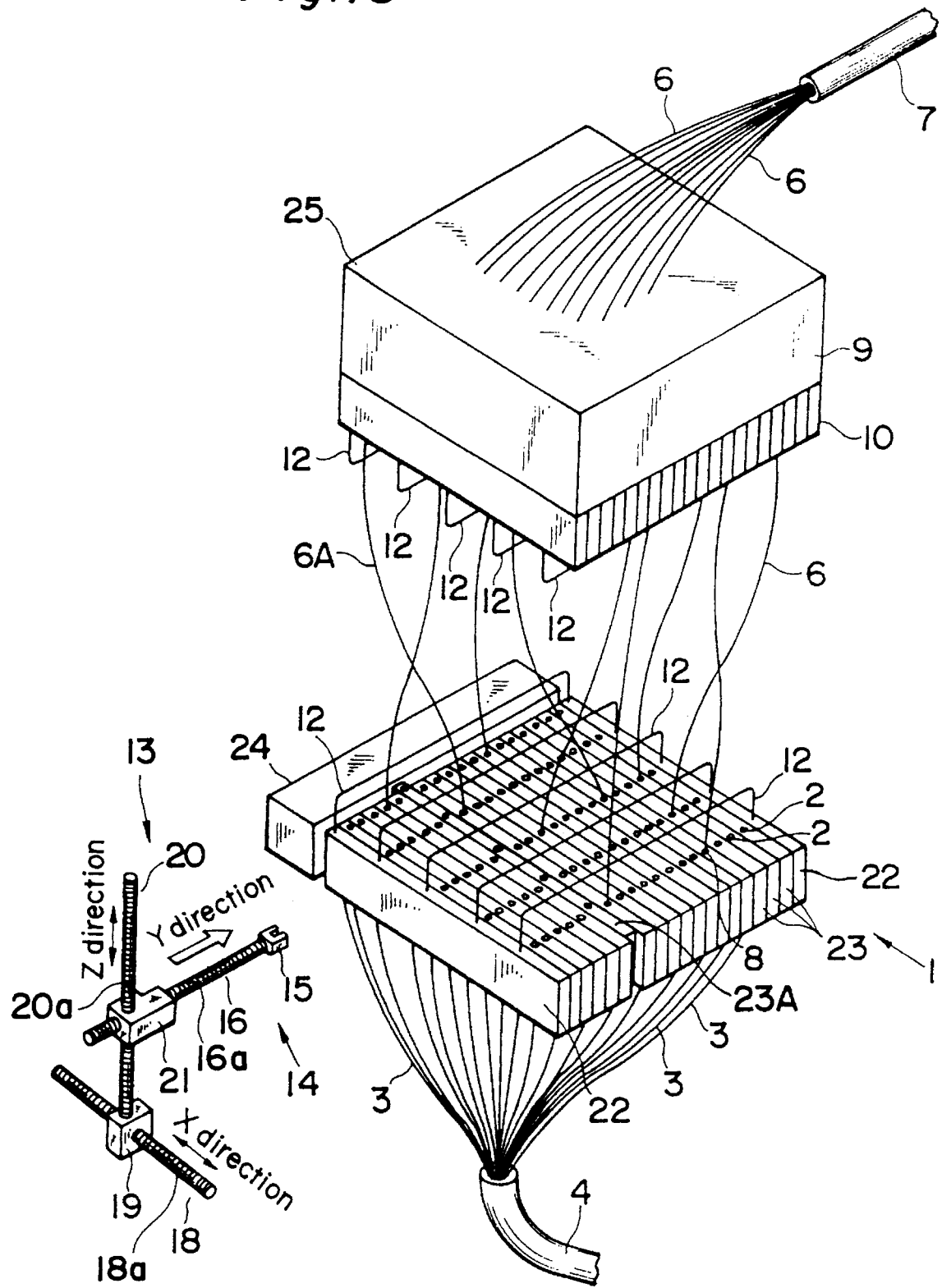
FIG. 13 shows a general perspective view of the optical fiber switching apparatus according to the third embodiment of the present invention.

The third embodiment of the optical fiber switching apparatus, as shown in FIGS. 11 to 13, comprises a coupling board 1 in the form of a matrix board, an optical fiber length adjusting unit 9, partition rods 12, a robot mechanism 13, and a solenoid mechanism 24.

As shown in FIG. 13, the coupling board 1 comprises a pair of plates 22 opposed to each other with a space therebetween, a plurality of optical fiber holding units 23 disposed between the pair of plates 22 and each holding in one row a plurality of first optical fibers 3 and a plurality of second optical fibers 6. The pair of plates 22 and the optical fiber holding units 23 constitute a block of generally rectangular section (the coupling board 1).

As shown in FIG. 11, each of the optical fiber holding units 23 has a plurality of connector adaptor holes (grooves) 26 formed vertically therein at a certain interval, and a smaller-diameter optical fiber insertion hole 27 is formed through the bottom portion of the connector adaptor 26.

On the bottom of the connector adaptor hole 26 there is provided a compression coil spring 28, and a chuck releasing ring 29 (release button) is provided on the compression coil spring 28 and in the connector adaptor hole 26.

As shown in FIG. 11, the chuck releasing ring 29 has a cylindrical shape having an open top and an open bottom, and has a circumferential step 30 bulged toward the center from a lower part of the inside circumferential surface. On the entire surface of the step 30 there is formed a slant surface 31 defining a hole having a downwardly reduced diameter.

As shown in FIG. 11, the chuck release spring 29 is urged by the compression coil spring 28 with the top end 29a exposed from the top surface of the optical fiber holding unit 23. The chuck release ring 29 accommodates a connector adaptor 2 vertical.

As shown in FIG. 11, each connector adaptor 2 has a cylindrical shape, and a projection 2a is formed on the entire central part of the outside circumferential surface of the connector adaptor 2. The connector adaptor 2 has a concavity 2b formed in the top in which is inserted a sleeve holder 32 from above.

As shown in FIG. 11, the sleeve holder 32 has a cylindrical shape of substantially downward-bracket sign shaped section, and is supported by the associated optical fiber holding unit 23 by the part which is positioned perpendicular to the drawing sheet so as to be securely positioned with respect to the coupling board 1.

On the entire periphery of the bottom of the sleeve holder 32 there is provided a flexible pawl 32a directed toward the center. This flexible pawl 23a engages with the projection 2a of the associated connector adaptor 2.

At the center of the inside of the top surface of each sleeve holder 32 there is formed a cylindrical housing 33 of substantially downward-bracket sign section. This housing 33 accommodates a substantially cylindrical slit sleeve 34. This slit sleeve 34 holds a first optical fiber 3 and a second optical fiber coupled with each other.

Thus, when a connector adaptor 2 is inserted from below into the lower opening of each sleeve holder 32, the flexible pawl 32a is gradually expanded, and when the connector adaptor 32 is further advanced, the flexible pawl 32a is brought into engagement with the projection 2a, and the connector adaptor 2 is securely inserted in the sleeve holder 32.

One end of the first optical fiber 3 is inserted in a ferrule 35 and further in a zirconia ferrule 36. This zirconia ferrule 36 is passed through the optical fiber insertion hole 27 of the associated connector adaptor 2 and through the compression coil spring 28 thereof, whereby the first optical fiber 3 is removably inserted in the associated connector adaptor 2.

The zirconia ferrule 36 is projected upward from the connector adaptor 2 into the slit sleeve 34.

The zirconia ferrule is plugged and unplugged by the action of a force in the direction of an optical axis.

On the other hand, one end of the second optical fiber 6 is inserted in a connector ferrule 35A and further in a zirconia ferrule 36A. This zirconia ferrule 36A is passed through the insertion hole of a ferrule chuck 37 which will be described later, and through the center of the sleeve holder 32 into the slit sleeve 34 to be connected with the zirconia ferrule to the first optical fiber 36 in the slit sleeve 34.

This zirconia ferrule 36A is also plugged and unplugged by the action of a force in the direction of an optical axis.

As shown in FIG. 12, the ferrule chuck 37 is made of a flexible member and has a substantially cylindrical shape having an open bottom. The ferrule chuck 37 is inserted in the chuck release spring 29 and accommodates the sleeve holder 32.

As shown in FIG. 12, the ferrule chuck 37 has an insertion hole 38 vertically formed through the center. The insertion hole 38 has a smaller diameter than the outer diameter of the connector ferrule 35A. A plurality of grooves 39 are formed in the side wall of the ferrule chuck 37 at a 90° interval around the insertion hole 38.

The grooves 39 quarter the side wall 40 of the ferrule chuck 37. the inside surface of the quartered side wall 40 serves to retain and reduce a diameter of the insertion hole 39.

The ferrule chuck 37 has an outer diameter of the lower part thereof gradually downwardly decreased in a substantially conical slant portion 41. This slant portion 41 is laid on the slant surface 31 of the chuck release ring 29 at the same angle.

When the slant surface 31 of the chuck release ring 29 is pressed against the slant portion 41 of the ferrule chuck 37, a connection force radially inwardly acts on the slant surface 40 of the ferrule chuck 37, and the inside circumferential wall of the quartered side wall 40 of the ferrule chick 37 reduces a diameter of the insertion hall 38, and the second optical fiber 6 inserted in the insertion hole 38 can be securely held.

When the hand portion 15 of the robot mechanism 13 lowers the upper end 29a of the chuck release ring 29, and the compression coil spring 28 is compressed, the chuck release ring 29 is lowered, leaving the slant surface 31 from the slant portion 41 of the ferrule chuck 37. Then the force which has been acting radially inwardly on the side wall 40 of the ferrule chuck 37 is removed or weakened, letting the ferrule chuck 37 back to its original configuration. And the required second optical fiber fastening of the ferrule chuck 37 is released.

As shown in FIG. 13, the optical fiber length adjusting unit 9 comprises a plurality of optical fiber length adjusting blocks laid on each other in the horizontal direction with the larger surfaces upright, and a single storage 25 mounted on the top surface of the optical fiber length adjusting blocks 10, and has a substantially rectangular parallelopiped and is positioned horizontally substantially very above the coupling board 1.

Each of the optical fiber length adjusting blocks 10 accommodates a pair of rotatable reels 11 urged by a spring (not shown) to space from each other. A part of a second optical fiber 6 is wound on the pair of reels 11.

The spring is given a spring constant smaller than a connection force between the first optical fiber 3 and the second optical fiber 6 which (the force) generates a force in the Z direction for the prevention of the release of the connection of the connectors.

Insertion holes for the partition rods 12 are formed at a certain interval in opposed ends of the underside of the optical fiber length adjusting unit 9, and each partition rod 12 is inserted horizontal in opposed ones of the insertion holes.

Each of the partition rods 12 has a bracket-sign shape as described above and is suspended in the Y direction with the horizontal part positioned lower.

Thus the partition rods 12 divide the undersides of the optical fiber length adjusting units 9 in at least five spaces so as to prevent the entanglement of the second optical fibers 6 near the undersides of the optical fiber length adjusting blocks 10.

The storage 25 is in the shape of a box of substantially rectangular cross-section, and stores drooped unused portions of the second optical fibers 6.

The optical fiber length adjusting unit 9, when a second optical fiber 6 is drawn out, rotates the reels 11 to pay out downward a necessary length of the second optical fiber 6, so that an unused portion of the second optical fiber 6 is handled for the prevention of the entanglement of the second optical fibers on the coupling board 1. This embodiment is the same in the other points as the above-described embodiment shown in FIG. 1.

Next, the operation of the optical fiber switching apparatus according to this embodiment will be explained.

When a first optical fiber 3 and a required second optical fiber 6A which are optically coupled to each other are uncoupled, the X-directional screw rod 18 and the Z-directional screw rod 20 are respectively rotated to move the robot hand 14 toward the space adjacent to the row the required second optical fiber belongs to.

Then the X-directional nut 19 and the Z-direction nut 21 are guided accurately in the same direction by the X-directional screw rod 18 and the Z-directional rod 20 on rotation to position the robot hand 14 in the space on the coupling board 1 adjacent to the required row.

When the robot hand 14 is positioned in the space of the coupling board 1 adjacent to the required row, the motor in the Z-directional nut 21 is actuated to move forward the arm portion 16 along the required row.

Since the spaces between the respective rows and their adjacent ones have been cleared of any obstacle, the move of the required second optical fiber 6A is never hindered by the other second optical fiber 6. In this operation, the robot hand 14 is moved forward over the top surface of the coupling board 1 along the required row near the hand portion 15 to the connector ferrule 35A of the required second optical fiber 6A to be switched.

At this time, based on an applied voltage the solenoids mechanism 24 pulls the lever 24a associated with the optical fiber holding unit 23 the required second optical fiber 6A belongs to the left as viewed in FIG. 13 to displace the connector adaptors 2 of the optical fiber holding unit 23 by a distance ½ the interval between the respective connector adaptors 2 and their adjacent ones.

This displacement brings only the connector adaptors 2 associated with the optical fiber holding unit 23 into the paths of the robot hand 14. Accordingly it is possible that the robot hand 14 make access and hold the required connector ferrule 35A without turning the wrist portion.

When the hand portion 15 is brought near to the connector ferrule 35A to be switched, the hand portion 15 lowers the top end 29a of the chuck release ring 29 surrounding the required second optical fiber 6A to compress the compression coil spring 28.

Then the chuck release ring 29 is lowered to leave the slant surface 31 from the slant portion 41 of the ferrule chuck 37. And a force which has been acting radially inwardly on the side wall 40 of the ferrule chuck 37 is removed or weakened to cause the ferrule chuck 37 to have its original shape, and the required optical fiber holding sate of the ferrule chuck 37 is released.

In this state the hand portion 15 holds the connector ferrule 35A of the required second optical fiber 6A and is moved upward in the Z direction from the top surface of the coupling board 1. And the lock of the connectors is released.

Since the surfaces of the connector ferrules 35 and those of the second optical fibers 6 define smooth continuous surface with a small friction coefficient and without any step, the hand portion 15 can hold and smoothly pull out the connector ferrule 35A of the required second optical fiber 6A.

When the hand portion 15 thus leaves the top end 29a of the chuck release ring 29, on which the hand portion 15 has been abutting, the compression coil spring 28 which has been compressed restores its original condition.

Then the chuck release ring 29 rises to press the slant surface 31 thereof against the slant portion 41 of the ferrule chuck 37, and the removed or weakened force tries to act radially inwardly on the side wall 40 of the ferrule chuck 37.

But the connector ferrule 35A can be timingly pulled out of the ferrule chuck 37, because the configurations and the positions, etc. of the ferrule chucks 37 and of the connector ferrules 35 have been so designed that an inner diameter of the ferrule chucks 37 does not become smaller than an outer diameter of the connector ferrules 35 until the connector ferrule 35A is pulled out. Thus the connector ferrule 35A can be timingly pulled out of the ferrule chuck 37.

When the lock of the connectors is released, the motor in the Z-directional nut 21 is again actuated to return the arm portion 16 to its original position in the direction of the rows of the second optical fibers 6.

Then, based on an applied voltage the solenoids mechanism 24 return the lever 24a of the optical fiber holding unit 23 associated with the required second optical fiber 6A to the right as viewed in FIG.13 to displace the optical fiber holding unit 23 by the distance ½ the interval between the respective connector adaptors 2 and their adjacent ones back to its original position.

When the arm portion 16 is positioned at its original position, X-directional screw rod 18 and the Z-directional screw rod 20 are again rotated to move the robot hand 14 toward the required row a required first optical fiber 3 belongs to.

Then the X-directional nut 19 and the Z-directional nut 21 are guided respectively by the X-directional screw rod 18 and the Z-directional screw rod 20 accurately in the same direction to position the robot hand 14 in the required row on the coupling board 1.

When the robot hand 14 is positioned in the required row on the coupling board 1, the motor in the Z-directional nut 21 is again actuated to move the arm portion 16 forward in the direction of the second optical fibers 6.

Since the spaces between the respective row and their adjacent ones have been cleared of any obstacle as described above, the move of the robot hand 14 is never blocked by the second optical fibers 6. In this operation the robot hand 14 is moved forward over the top surface of the coupling board 1 in the direction of the required row to bring the hand portion 15 near to the connector adaptor 2 of the required first optical fiber 3 for the required second optical fiber 6A to be switched to.

At this time, based on an applied voltage the solenoids mechanism 24 pulls the optical fiber holding unit 23 the required first optical fiber 3 belongs to the left as viewed in FIG. 13 displace the connector adaptors 2 of the optical fiber holding unit 23 by the distance ½ the interval between the respective connector adaptors 2 and their adjacent ones.

This displacement bring only the connector adaptors 2 of the optical fiber holding unit 23 into the paths of the robot hand 14, so that the robot hand 14 can easily make access and hold the ferrule chuck 37 of the required first optical fiber 3.

When the hand portion 15 is brought near to the connector adaptor 2 for the required second optical fiber 6A to be switched to, the hand portion 15 connects the connector ferrule 35A of the required second optical fiber 6A to the ferrule chuck 37 of the required first optical fiber 3 to lock the connectors, and the switching operation is completed.

In the above-described arrangement, since the spaces for the robot hand 14 to intrude into can be secured by the partition rods 12 on the top surface of the coupling board 1, disadvantages that the second optical fibers 6 gather on the top surface of the coupling board 1 to much lower the operation of coupling the optical fibers 3, 6 or to cause frequent occurrences of coupling errors can be prevented.

Further, the disadvantage that when one slide terminal is switched to another slide terminal, the concentration of the optical fibers is always a serious problem can be prevented.

Furthermore, since large spaces are not necessary for coupling the optical fibers 3, 6 on the top surface of the coupling board 1, the disadvantage of unpreferable large-sizes of the device as a whole can be prevented.

Since only a selected optical fiber holding unit 23 is displaced into the paths for the robot hand 14 to intrude into, the robot hand 14 can very easily hold a connector 8.

Furthermore, since the robot mechanism 13 can be made compact, it can be expected that the robot mechanism 13 can be small-sized. It can be realized by this compaction to make the coupling board 1 denser.

A required optical fiber 6A holding state of a ferrule chuck 37 cannot be released until a force which has been acting radially inwardly on the side wall 40 of the ferrule chuck 37 is removed or weakened as the associated chuck release ring 29 is lowered, and the ferrule chuck 37 restores its original configuration.

Accordingly the disadvantage that the required second optical fiber 6A comes off the coupling board 1 due to a cause, disconnected from a first optical fiber 3 can be eliminated.

The above-described embodiments use the partition rods 12, but instead plate members may be used.

The slide means may not be provided essentially by the solenoids mechanism 24 but in place by a combination of a rack and pinion, a motor, etc.

The arrangement by which the optical fiber holding units 23 are pushed out can still the same functional effects as in this embodiment.

The apparatuses related to the invention cover other various modifications within the scope leaving the gist thereof. In the above-described embodiments, the ferrule chucks 37 are opened and closed by the robot hand 14, but instead a solenoid or the like is build in the coupling board 1 to open and close the ferrule chucks 37.

Figure 14:
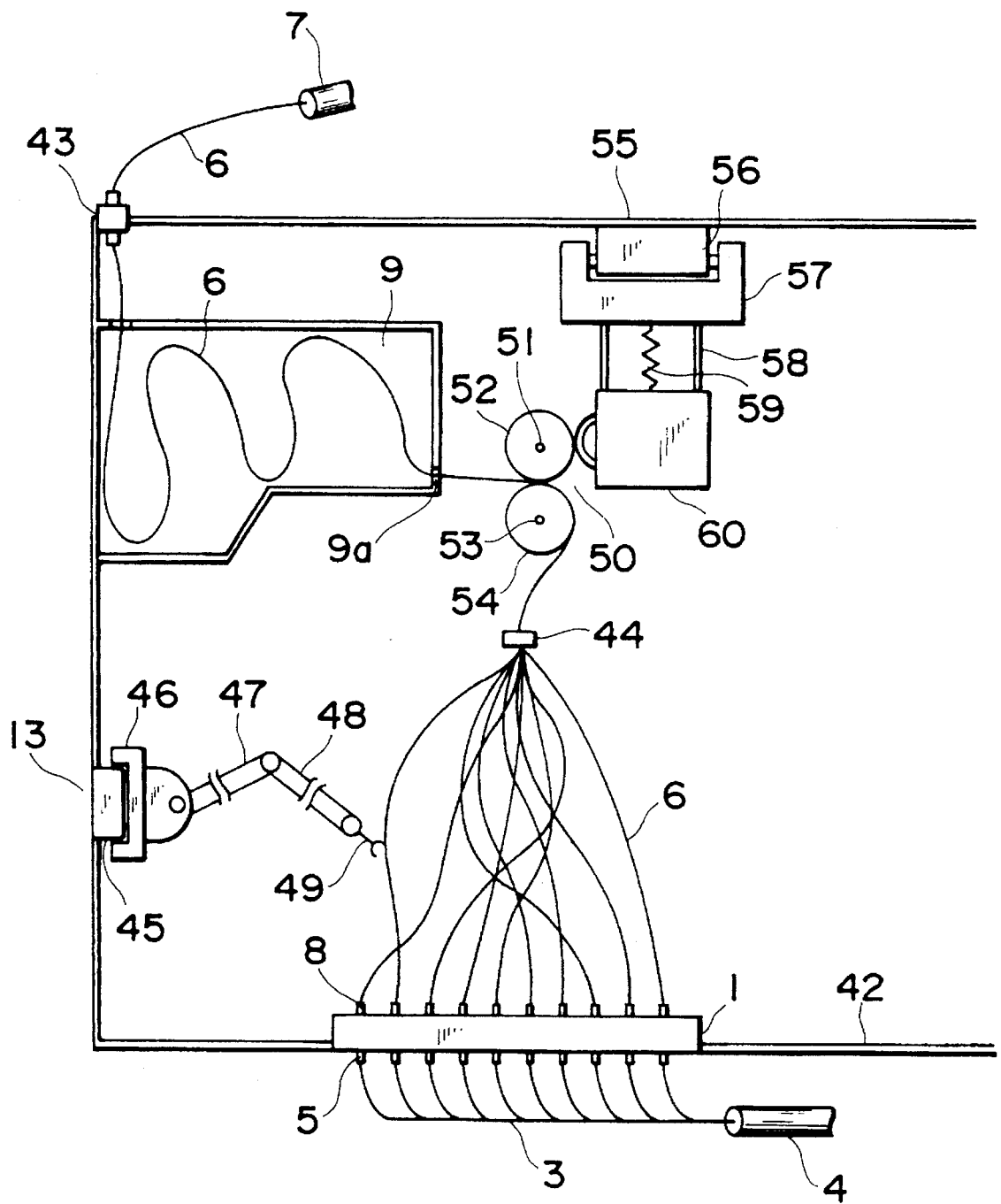
FIG. 14 shows a general perspective view of a fourth embodiment of an optical fiber switching apparatus according to the present invention.
Figure 15:
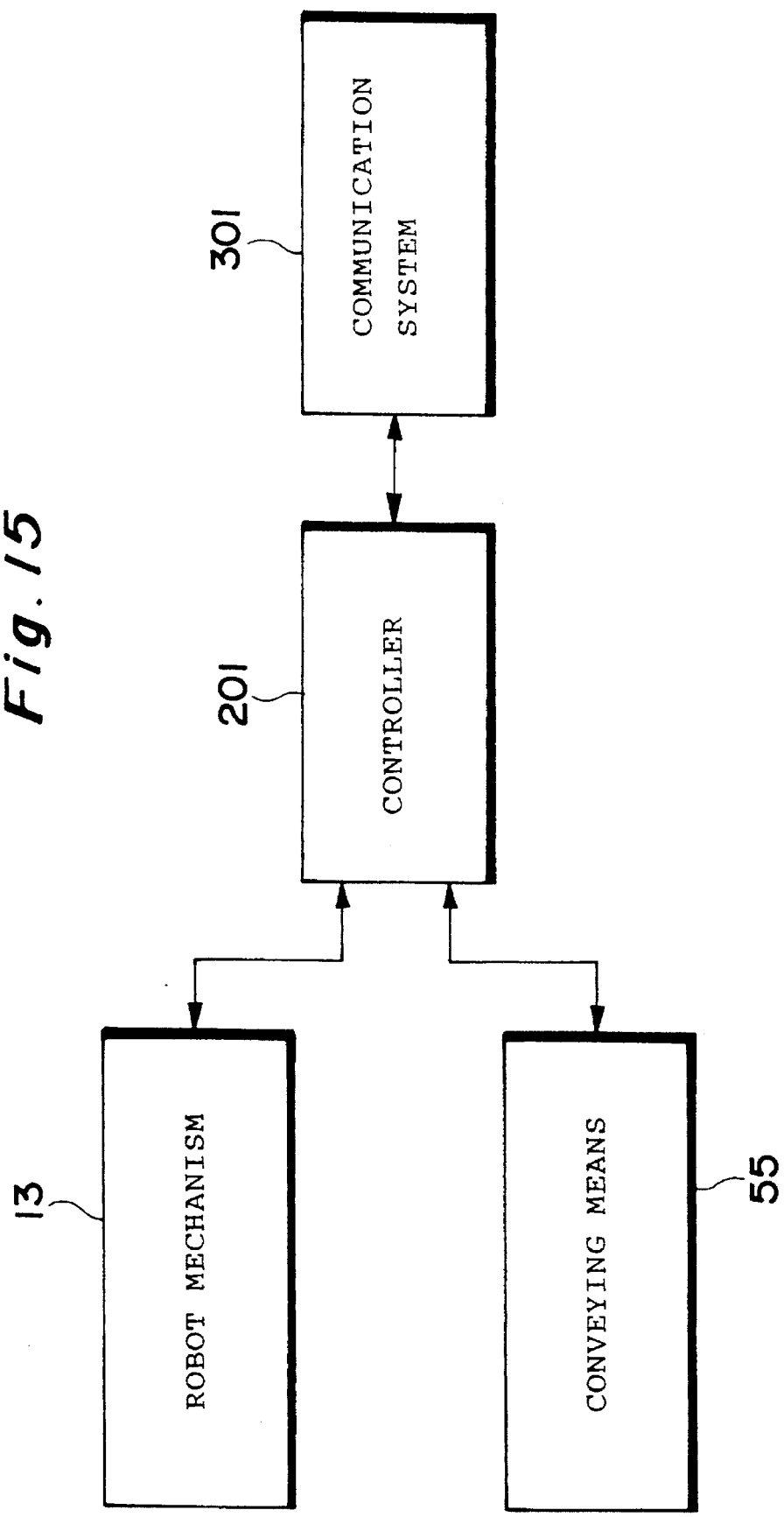
FIG. 15 shows a block diagram of a second embodiment of a robot mechanism used in the optical fiber switching apparatus shown in FIG. 14.
Figure 16:
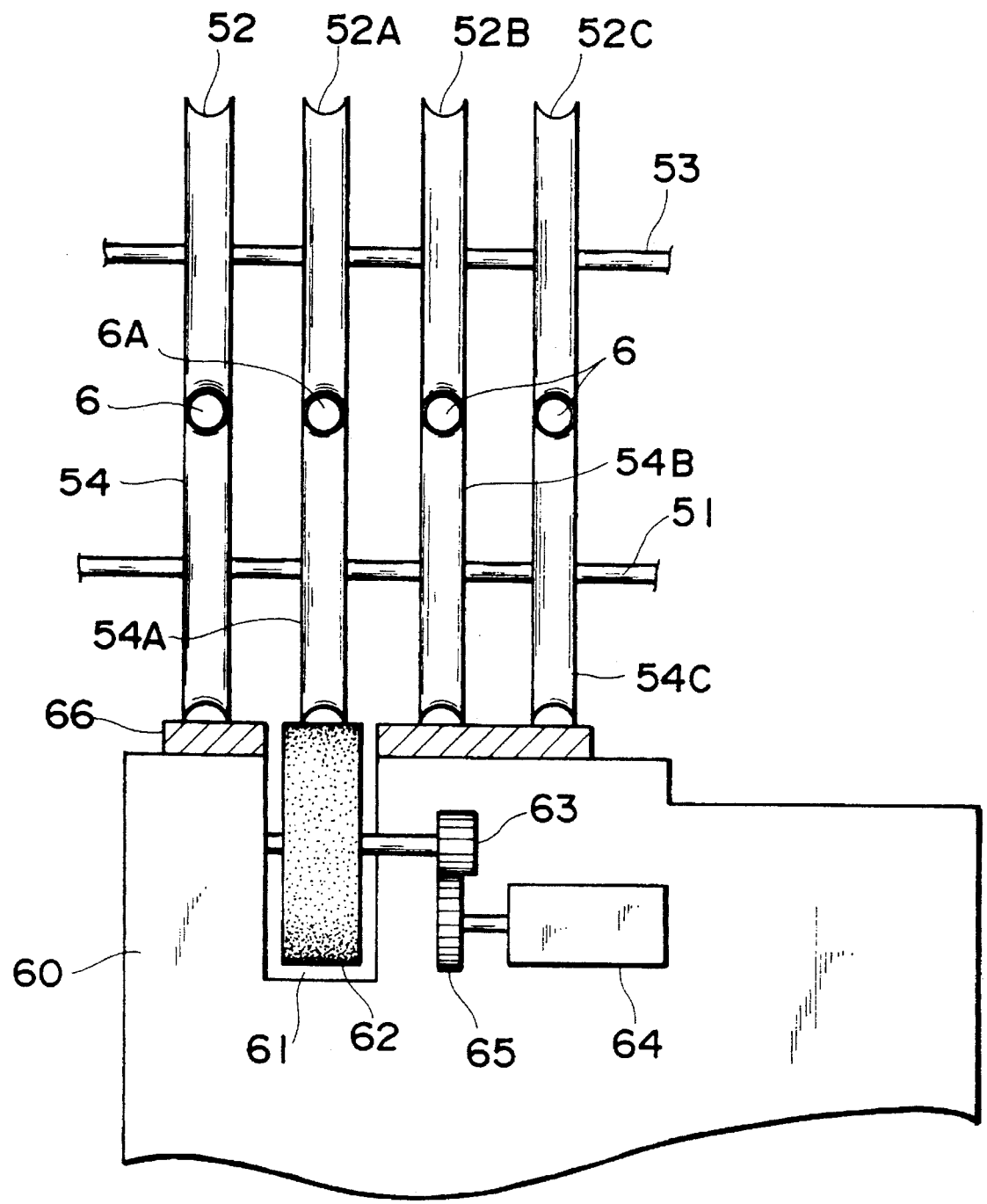
FIG. 16 shows a sectional view of a major part of the fourth embodiment of the invention shown in FIG. 14.

Next, a fourth embodiment of an optical fiber switching apparatus, as shown in FIGS. 14 to 16, will be explained. In the explanation common elements have common reference numerals not to repeat their explanation.

As shown in FIG. 14, the optical fiber switching apparatus according to the fourth embodiment comprises a coupling board 1, first optical fibers 3, second optical fibers 6, optical fiber length adjusting units 9, a robot mechanism 13, rotary bodies 50, and a selective carrying mechanism 55.

As shown in FIG. 14, the coupling board 1 is in the form of a matrix board of rectangular cross-section and has a plurality of connector adaptor holes (not shown) formed vertically therein in a matrix of rows and columns.

The coupling board 1 includes connector adaptors for connection (not shown) fitted in the respective connector adaptor holes, and is laid on the inside bottom of an optical fiber coupling box 42 having a substantially box-like shape.

As shown in FIG. 14, a plurality of first optical fibers 3 are extended from a first optical cable 4 disposed outside and below the optical fiber coupling box 42. Ferrules on the ends of the first optical fibers 3 are inserted connectors 5 for connection of the optical fibers, and the connectors 5 detachably inserted in the respective connector adaptors from the side of the underside of the coupling board 1.

On the other hand, a plurality of second optical fibers 6 are extended from a second optical cable 7 disposed outside and above the optical fiber coupling box 42 into the optical fiber coupling box 42 through a plurality of connector adaptors 43.

Connectors 8 on the forward ends of the second optical fibers 6 are detachably inserted into and held by the connector adaptors in the coupling board 1 sequentially through the optical fiber length adjusting unit 9, the rotary body 50, and a grouping member 44, so as to be coupled opposed to the first optical fibers 3 through the connector adaptors in the coupling board 1.

The connector adaptors 43 are juxtaposed inwardly as viewed in FIG. 14 on an inside upper corner of the optical fiber coupling box 42 in a plural number corresponding to a number of the second optical fibers 6.

The grouping member 44 is disposed above the coupling board 1, and the second optical fibers 6 are passed vertically through the grouping member 44. The grouping member 44 functions to collect the second optical fibers 6 in a single bundle to position the second optical fibers 6 at a small distance above the coupling board 1.

As shown in FIG. 14, each optical fiber length adjusting unit 9 is defined in a substantially box-like shape by some partition plates at an upper part of the interior of the optical fiber coupling box 42. The optical fiber length adjusting units 9 are provided in a plural number corresponding to a number of the second optical fibers 6 and are juxtaposed inward as viewed in FIG. 14.

The optical fiber length adjusting units 9 has the function of taking in through the associated outlet ports 9a unused portions of the associated second optical fibers 6 introduced in the optical fiber coupling box 42.

As shown in FIG. 14, a second embodiment of the robot mechanism 13 comprises a guide rail 45 projected in an inward direction of the box 42, a robot body 46 engaged with the guide rail 45 and being slidably movable along the guide rail 45, a first arm 47 having one end pivotally connected to the robot body 46 by a pin rotatably upward and downward, a second arm 48 having one end pivotally connected to another end of the first arm 47 by a pin rotatably upward and downward, and a fork hand 49 mounted on another end of the second arm 48 rotatably upward and downward for engage and holding a connector 8.

As shown in FIG. 15, the robot mechanism 13 is controlled by a controller 201. Further, the controller 201 controls the mechanism 55 as conveying means with the robot mechanism 13 by receiving control signals from communication system 301.

By the operation of the controller 201, the robot mechanism 13 functions to select a required one 6A out of the second optical fibers 6 optically coupled with the first optical fibers 3, and detaching and attaching the required second optical fiber 6A for switching to a required first optical fiber 3.

In this embodiment, the robot mechanism 13 has the fork hand 49 but may have a different type of hand.

As shown in FIG. 16, the rotary bodies 50 (gripping, means) comprise drive pulleys (rotary grippers) 52, 52A, 52B. 52C rotatably mounted on a drive shaft 51 in a number corresponding to a number of the second optical fibers 6, a number of driven pulleys (rotary grippers) 54, 54A, 54B, 54C mounted rotatably on a driven shaft in a number corresponding to the number of the second optical fibers, and opposed respectively to the drive pulleys 52, 52A, 52B, 52C positioned very above the respective driven pulleys, and a neighboring spring (not shown) wound on the drive shaft 51 and the driven shaft 53 for normally neighboring the drive and the driven pulleys 42, 52A, 52B, 52C; 54, 54A, 54B, 54C respectively opposed to each other.

As shown in FIGS. 14 and 16, these rotary bodies 50 are disposed near the respective optical fiber length adjusting units 9 and functions to feed between the drive and the driven pulleys 52, 52A, 52B, 52C; 54, 54A, 54B, 54C the second optical fibers 6 extended through the outlet ports 9a of the optical fiber length adjusting units 9 at a certain arrangement pitch.

As shown in FIGS. 14 and 16, the above-described selective carrying mechanism 55 (conveying means) comprises a guide rail 56 projected from the ceiling of the optical fiber coupling box 42 at a position above the drive pulleys 52, 52A, 52B, 52C, and a carrying mechanism body (main body) 57 engaged with the guide rail 56 and being slidably movable along the guide rail 56.

From the main body 57 are suspended a plurality of guide rods 58. At the lower ends of the guide rods 58 there is provided a pendant body 60 which is normally urged downward movably upward and downward by the urging effect of a spring 59.

A part of the pendant opposing to the drive pulleys 52, 52A, 52B, 52C is recessed, as shown in FIG. 16, for a rubber roller accommodating portion 61, and in the recess 61 there is rotatably mounted a rubber roller 62 on a shaft. The rubber roller 62 is slidably contacted with one of the drive pulleys (drive rotary bodies) 52,52A, 52B, 52C, and a gear 63 mounted on the end of the shaft of the rubber roller 62 is in mesh with a gear 65 of a motor 64 for driving the rubber roller 62.

As shown in FIG. 16, a brake pad (restraining part) of rubber or the like is adhered to a part of the pendant body 60 to be opposed to one of the drive pulleys 52, 52A, 52B, 52C, and when one of the drive pulleys 52, 52A, 52B, 52C is on rotation, the brake pad 66 is pressed against one of the other drive pulleys 52, 52A, 52B, 52C to restrain the rotation of the other neighboring pulleys.

Thus mechanism 55 has the function of selectively rotating only one of the drive pulleys and one of the driven pulleys gripping a required second optical fiber 6A selected by the robot mechanism 13 to carry to and store in the associated optical fiber length adjusting unit 9 an unused portion of the required second optical fiber 6A.

Meanwhile the brake pad 66 functions to press and restrain the rotation of the other neighboring drive and driven pulleys.

In FIG. 16, for example, when the required second optical fiber 6A of the second optical fibers 6 is selected and switched, first the robot mechanism 13 is slid along the guide rail 45 from its original position to the position where the robot mechanism 13 is opposed to the required second optical fiber 6A.

Then the first arm 47 and the second arm 48 are extended on rotation toward the required second optical fiber 6A, and the fork hand 49 holds the connector 8 of the required second optical fiber 6A. Then the fork hand 49 is swung to the left and the right and pulls out the required second optical fiber 6A out of the connector adaptor.

Then when the disconnection of the required second optical fiber 6A is detected, the main body 57 is slid along the guide rail 56 from its original position to a position where the required second optical fiber 6A is opposed to the drive pulley 52A which is to grip the required second optical fiber 6A in cooperation with the driven pulley 54A.

Then the rubber roller 62 is slidably pressed against the drive pulley 52A while the brake pad 66 is pressed against the other neighboring drive pulleys 52, 52B, 52C.

Then the motor for driving the rubber roller 62 is driven to rotate the gear 65. The rotation of the gear 63 rotates the rubber roller 62. The rubber roller 62 rotates the drive pulley 52A clockwise while driving the driven pulley 54A counterclockwise.

At this time since the other drive pulleys 52, 52B, 52C neighboring the drive pulley 52A are pressed by the brake pad 66 as shown in FIG. 16, these rotations are restrained without failure.

Then the rotations of the drive pulley 52A and of the driven pulley 54A sends an unused portion of the gripped second optical fiber 6A from the top surface of the coupling board 1 toward the associated optical fiber length adjusting unit 9 to be stored therein. Accordingly the unused portion of the required second optical fiber 6A is prevented from entangling with the other second optical fibers 6.

Then the robot mechanism 13 make the robot body 46 slid along the guide rail 45 to a position where the body 46 is opposed to the connector adaptor of the required first optical adaptor.

Then the first arm 47 and the second arm 48 are extended on rotation to cause the fork hand 49 holding the connector 8 of the required second optical fiber 6A to connect the connector 8 to the connector adaptor of the required first optical fiber 3, and the connection switching operation is completed.

In the above-described arrangement, the robot mechanism 13 in place of an operator automatically switch a selected second optical fiber 6A. As results, the operation of connection switching is much improved, and operating costs are much lowered.

Much improvement of maintenance operations are expected. Since the brake pad 66 restrains without failure the rotation of those of the drive pulleys 52, 52B, 52C and those of the driven pulleys 54, 54B, 5C which are gripping the second optical fibers not selected by the robot mechanism 13, the second optical fibers which have not been selected are securely kept from damages.

Figure 17:
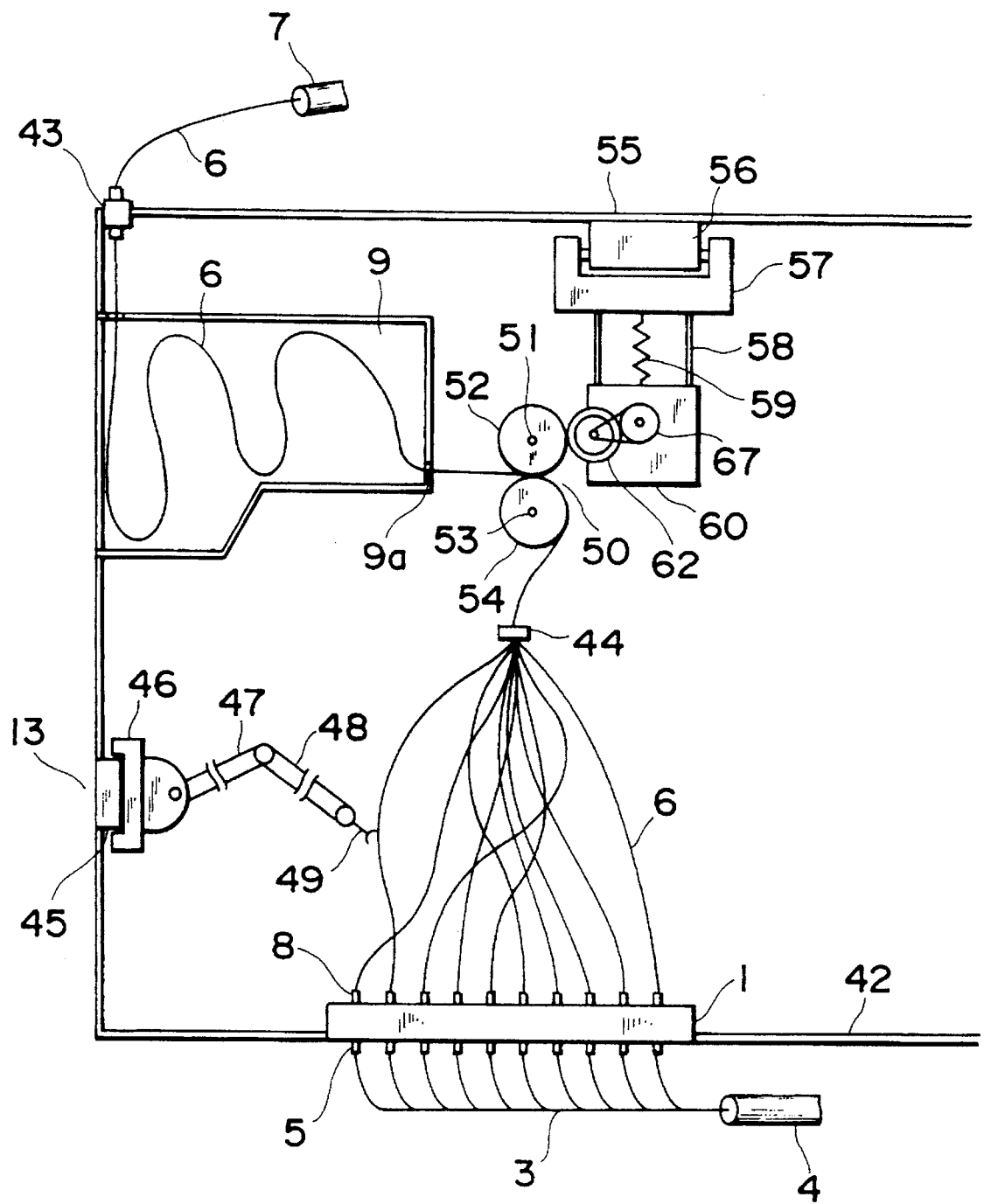
FIG. 17 shows a detailed view of a fourth embodiment of an optical fiber switching apparatus according to the present invention.

In this embodiment, the rubber roller 62 is rotated by the mesh between the gears 63, 65, but as shown in FIG. 17, a timing belt 67 or the like may be used to rotate the rubber roller 62 still with the same functional effect achieved.

Finally, a fifth embodiment of an optical fiber switching apparatus according to the present invention will be explained by means of FIGS. 18 to 24. Common elements have common reference numerals not to repeat their explanation.

Figure 18:
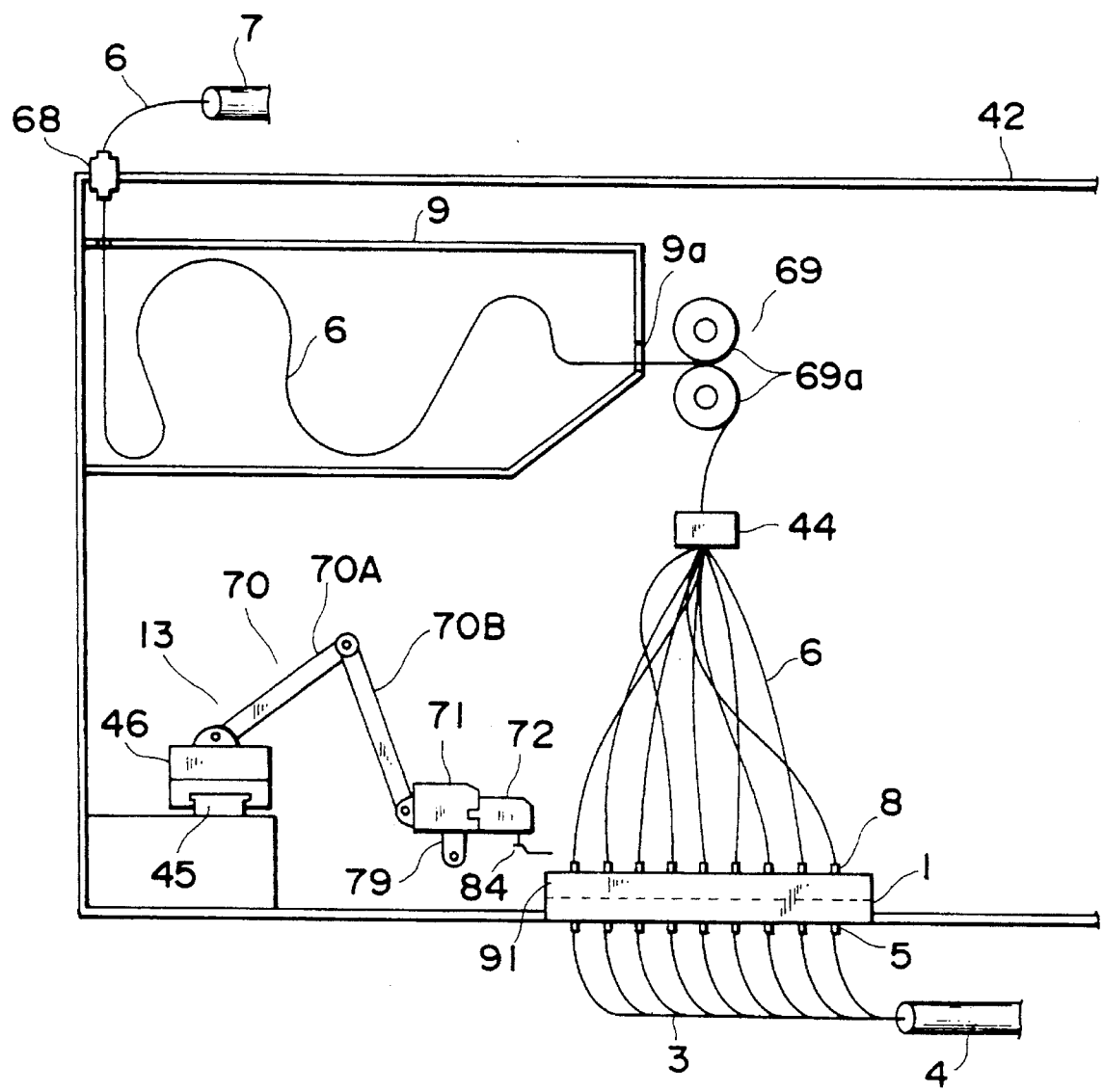
FIG. 18 shows a general perspective view of a fifth embodiment of an optical fiber switching device according to the present invention.

As shown in FIG. 18, the optical fiber switching apparatus according to the fifth embodiment comprises a coupling board 1, a optical fiber length adjusting unit 9, rotating body 69 (gripping means), a robot mechanism 13, a guide groove 91 (guide means), and a guided lever 79 (guided means).

Figure 19:
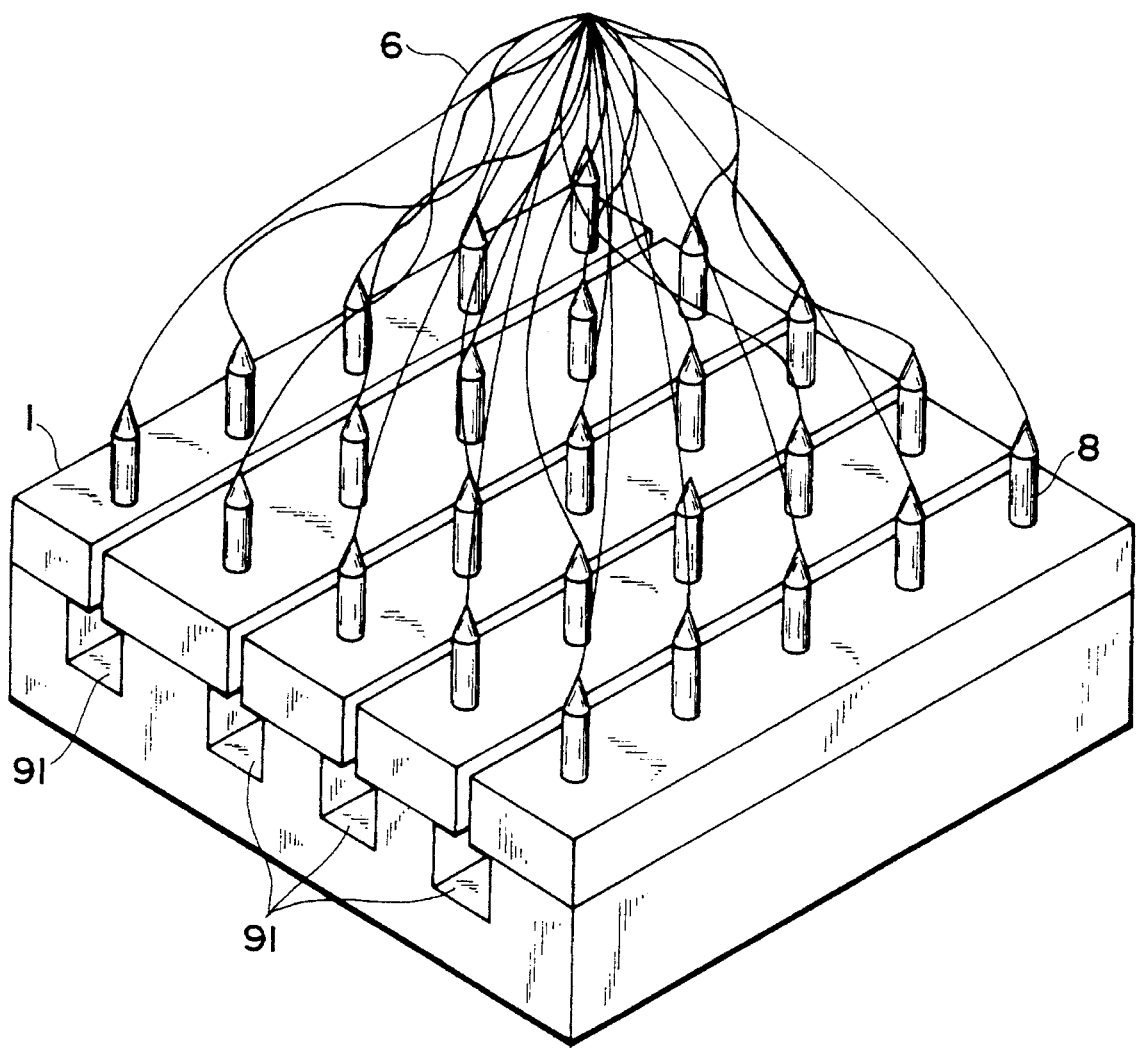
FIG. 19 shows a perspective view of the coupling board of an optical fiber switching apparatus according to the fifth embodiment shown in FIG. 18.
Figure 21:
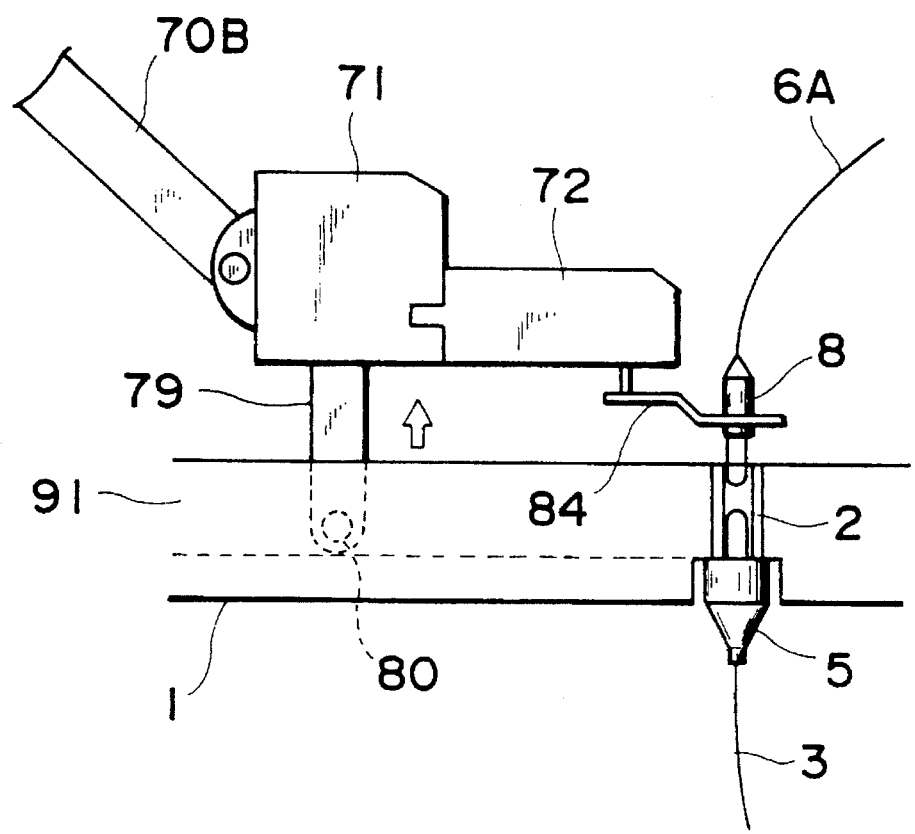
FIG. 21 shows a view explaining a pulled-off state of a second optical fiber in the optical fiber switching apparatus according to the fifth embodiment shown in FIG. 18.

As shown in FIGS. 18, 19 and 21, the coupling board 1 in the form of a matrix board has rectangular cross-section and has a plurality of cylindrical connector adaptors vertically formed therethrough in a matrix of rows and columns.

The coupling board 1 has connector adaptors for connection fitted in the connector adaptor holes, and is laid on the inside bottom of a substantially box-shaped optical fiber coupling box 42.

As shown in FIG. 18, a plurality of first optical fibers 3 are extended from a first optical cable 4 outside and below the coupling box 42. The ferrules (not shown) on the forward ends of the first optical fibers 3 are inserted in the connectors 5 for connection, and the connectors 5 are detachably inserted in the connector adaptors in the coupling board 1 from below.

As shown in FIG. 18, a plurality of second optical fibers 6 are extended from a second optical cable 7 disposed outside and above the coupling box 42 and are introduced from the optical cable 7 into the coupling box 42 through introduction connectors 68.

The ferrules on the forward ends of the second optical fibers 6 are inserted in connectors 8 for connection of the optical fibers, and the connectors 8 are detachably inserted from above in the connector adaptors in the coupling board 1 by way of rotary body 69 and a grouping member 44.

As shown in FIG. 19, the second optical fibers 6 are detachably inserted in the top surface of the coupling board 1 in the matrix of rows and columns, coupled respectively with the first optical fibers 3.

As shown in FIG. 18, the introduction connectors 68 are juxtaposed in a number corresponding to a number of the second optical fibers 6 inwardly on the left side of the ceiling of the coupling box 42.

The optical fiber length adjusting units 9 respectively have a substantially box-like shape defined by a plurality of plates and are juxtaposed inwardly on the left side of the interior of the coupling box 42 in a number corresponding to the number of the second optical fibers 6. A function of the units 9 to store unused portions of the second optical fibers 6.

As shown in FIG. 18, the rotary body 69 is disposed near the outlets 9a of the optical fiber length adjusting units 9 and has a plurality of pairs of pulleys 69a which rotatably grip the respective second optical fibers 6 fed at a certain arrangement pitch from the outlets 9a.

Thus the pairs of rotary body 69 are rotated to accommodate unused portions of the second optical fibers 6 for the prevention of the entanglement of the second optical fibers 6 on the top surface of the coupling board 1.

The grouping member 44 is disposed very below the pairs of the rotary bodies 69 to collect the second optical fibers 6 suspended from the pairs of pulleys 69a in a single bundle and positioning the second optical fiber 6 from a lower position.

The robot mechanism 13 is controlled by the controller shown in FIG. 15, and comprises a guide rail 45 horizontally laid inward on the left side of the interior of the coupling box 42, and a robot body 46 engaged with the guide rail 45 and being slidably movable along the guide rail 45.

An arm 70 is attached to the robot body 46 by a pin swingably upward and downward, and to the forward end of the arm 70 there is attached a head 71 by a pin swingably upward and downward. The arm 70 comprises a first arm 70A has one end pivotally joined to the body 46 by a pin, and a second arm 70B has one end pivotally joined to another end of the first arm 70A by a pin. The head 71 has a swingable head 72 which is horizontally swingable, and is pivotally joined to another end of the second arm 70B by a pin.

Figure 20:
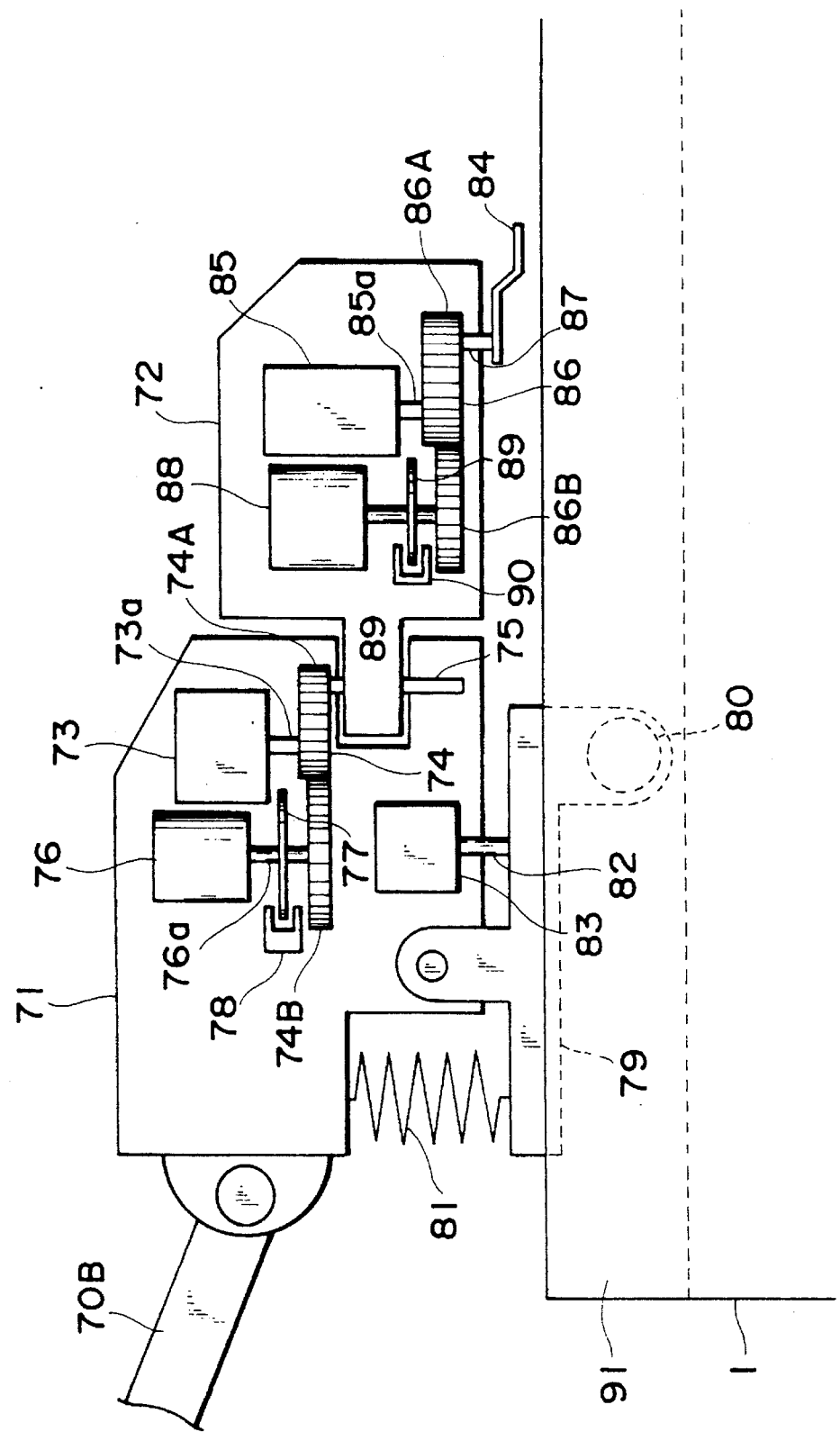
FIG. 20 shows a sectional view of a head of a robot mechanism of the fifth embodiment shown in FIG. 18.

As shown in FIG. 20, the head 71 accommodates motor 73 for horizontally swinging a swing head 72. A gear 74 which is in mesh with a gear 74A is mounted on a downwardly extended rotary shaft 73a of the motor 73. In the gear 74A there is inserted a rotary shaft 75 which is vertically extended in the head 71 through the swing head 72 for swingably supporting the heads 71, 72.

As shown in FIG. 20, in the head 71, adjacent to the motor 73 there is provided an encoder 76 for the swing head.

On a downwardly extended rotary shaft 76a of the encoder 76 there is mounted a gear 74B which is in mesh with the gear 74 of the motor 73, and a disk 77 with slits (not shown). The peripheral portion of the disk 77 is sandwiched with an optical sensor 78, so that a swing area of the swing head 72 ca be detected.

Figure 22:
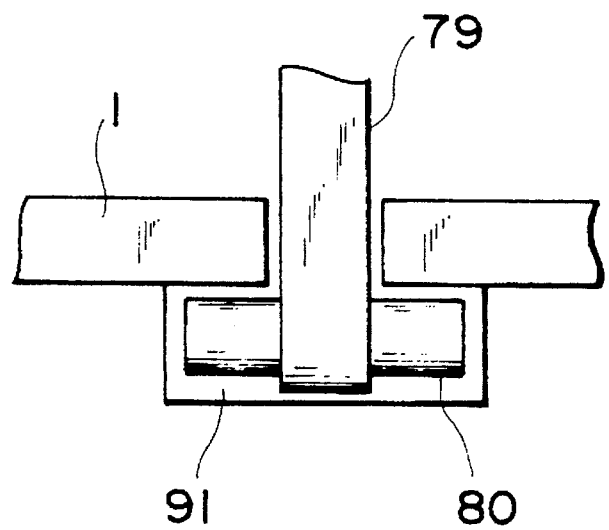
FIG. 22 shows a view explaining an engagement of a guided lever of the robot mechanism in a guide groove, which are involved in the fifth embodiment shown in FIG. 18.

As shown in FIGS. 20 to 22, a substantially L-shaped guided lever 79 is mounted upwardly and downwardly swingably on a shaft below the head 71. In a downwardly projected lug of the guided lever 79 there is horizontally inserted an engaging lever 80 which is rotatably engaged in the guide groove 91, which will be explained below.

Between a horizontal end of the guide lever 79 and the bottom of the back side of the head 71 there is vertically expanded a compression spring 81 for urging the guided lever 79A normally upward.

The head 71 there further has a solenoid 83 with a upwardly and downwardly movable pusher rod 82 for pushing down the guided lever 79 when a second optical fiber 6 is pulled out.

As shown in FIG. 20, in the swing head 72 there is provided a motor 85 for horizontally swinging a hand 84. On a downwardly extended rotary shaft 85a of the motor 85 there is mounted a gear 86 which is in mesh with a gear 86A. In the gear 86 there is inserted a rotary shaft 87 which is extended downward and supports a hand 84 on the lower end.

Figure 23:
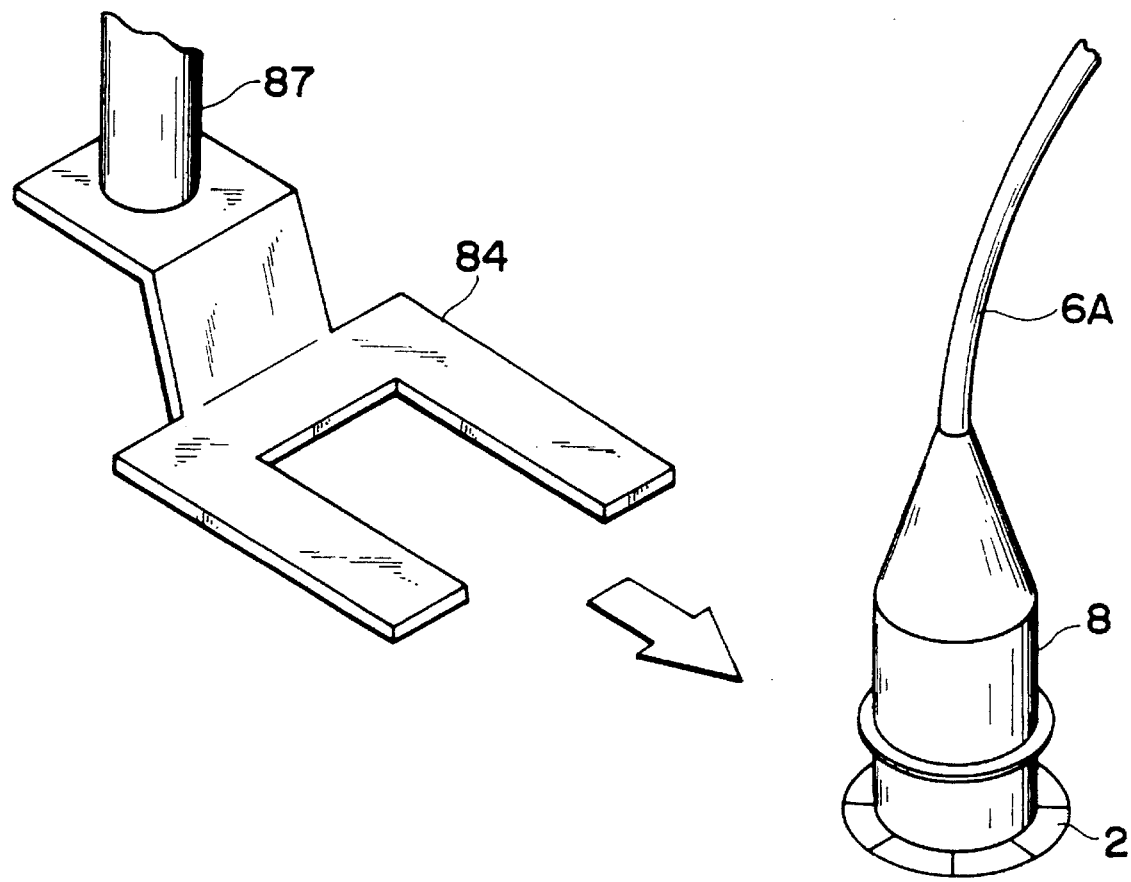
FIG. 23 shows a perspective view explaining a relationship between a hand of the robot mechanism and a second optical fiber, which are involved in the fifth embodiment shown in FIG. 18.

As shown in FIG. 23, the hand 84 has fork-shaped cross-section and has the bisected forward ends curved downward. The hand 84 is extended downward below the forward portion of the underside of the swing head 72 and then horizontal. The hand 84 is horizontally swung to make the function of pulling out a required second optical fiber 6 gripped between the bisected forward ends and uncoupling the same from a first optical fiber 3.

As shown in FIG. 20, in the swing head 72, adjacent to the motor 85 there is provided an encoder 88 for the hand 84.

On a downwardly extended rotary shaft 89 of the encoder 88 there is mounted a gear 86B which is in mesh with a gear 86 for the motor 85 and a disk 89 with slits (not shown).

The peripheral portion of the disk 89 is sandwiched by an optical sensor 90, so that a swing area of the hand 84 can be detected.

The guide grooves 91 are formed in the tops surface of the coupling board 1 inwardly, i.e., from the left to the right as viewed in FIG. 19 between respective rows of the second optical fibers and their adjacent ones.

As shown in FIGS. 20 to 22, when a second optical fiber 6 is pulled out, the lever 80 of the guided lever 79 is engaged in a guide groove 91 loosely with a small gap and functions to smoothly guide and accurately position the head 71 of the robot mechanism 13 in the horizontal direction.

Accordingly when a required second optical fiber 6A is selected out of the second optical fibers 6 coupled with the first optical fibers 3 and switch the required second optical fiber 6A, as shown in FIG. 18 first the robot body 46 of the robot mechanism 13 is slid along the guide rail 45.

Then the robot mechanism 13 is moved the robot body 46 from its original position to a position where the robot body 46 is opposed to a guide groove 91 adjacent to the required second optical fiber 6A.

When the robot mechanism 13 arrives at the opposing position and stops there, the arm 70 swings downward to oppose the lever 80 of the heard 71 to the guide groove 91, and the arm 70 is extended to the right as viewed in FIG. 18 to pass or insert the guided lever 79 of the head 71 and the lever 80 through or into the guide groove 91.

Subsequently as the arm 70 is extended, the head 71 is moved to the right along the guide groove 91 and is brought near to the required second optical fiber 6A to be switched.

Then when the head 71 is positioned near the required second optical fiber 6A to be switched, the motor 73 is actuated to rotate the gear 74A in mesh with the gear 74, and the rotary shaft 75 is rotated to swing the swing head 72 toward the required second optical fiber 6A.

The motor 85 is actuated to rotate the gear 86A in mesh with the gear 86, and the rotary shaft 87 is rotated to swing the hand 84 toward the required optical fiber 6A.

Thus the connector 8 of the required second optical fiber 6A is held by the hand 8. The swing of the swing head 72 and the hand 84 are controlled based on the detection of the encoders 76, 88 adapted to receive control signals from the controller 201.

Then when the required second optical fiber 6A to be switched is held by the hand 84, the pusher rod 82 of the solenoid 83 is projected downward to urge downward the upwardly urged guided lever 79. Due to the reaction force the head 71 is moved upward, and accompanying this upward movement of the head 71, the required second optical fiber 6A held by the hand 84 is moved upward to be uncoupled from the associated with the first optical fiber 3.

When the pull-out of the required second optical fiber 6A is detected, the associated pair of rotary body 69 is rotated to store an unused portion of the required second optical fiber 6A into the associated optical fiber length adjusting unit 9. As results, the required second optical fiber 6A is prevented from entangling with the other second optical fibers 6 on the coupling board 1.

When the required second optical fiber 6A to be switched is pulled out, as the arm 70 is swung to its original position, the head 71 leaves the pull-out position along the guide groove 91 to the left as viewed in FIG. 18, and the guided lever 79 of the head 71 and the lever 80 are disengaged from the guide groove 91.

Then the robot body 46 of the robot mechanism 13 is slid along the guide rail 45 to a position where the robot body 46 is opposed to a guide groove 91 adjacent to the connector adaptor holding a required first optical fiber 3.

Next, when the robot mechanism 13 arrives at the opposing position and stops, the arm 70 is again swung downward to oppose the lever 80 of the head 71 to the guide groove 91. The arm 70 is extended to the right as viewed in FIG. 18 to pass or inserted the guided lever 79 and the lever 80 through or into the guided groove 91.

Then as the arm 70 is extended, the head 71 is moved to the right along the guide groove 91 to be brought near to the connector adaptor of the required first optical fiber 3 for the required second optical fiber 6A to be switched to.

Subsequently when the head 71 is brought near to the connector adaptor of the required first optical fiber 3 for the required second optical fiber to be switched to, the drive motor 73 is actuated to rotate the gear 74A in mesh with the gear 74. The rotary shaft 74 is rotated to swing the swing head 72 toward the connector adaptor.

The motor 85 is actuated to rotate the gear 86A in mesh with the gear 86. The rotary shaft 87 is rotated to swing the hand 84 toward the connector adaptor.

The swing of the swing head 72 and the hand 84 is controlled based on the detection of the encoders 76, 88 as described above.

When the required second optical fiber 6A to be switched is brought near to the connector adaptor 2, the connector 8 of the held second optical fiber 6A is connected to the connector adaptor, and the required second optical fiber 6A is coupled with the required first optical fiber 3.

Thus when the required second optical fiber 6A is connected, as the arm 70 is swung to its original position, the head 71 leaves the connecting position along the guide groove 91 to the left, and the guided lever 79 of the head 71 and the lever 80 are disengaged from the guide groove 91.

Subsequently the robot body 46 of the robot mechanism 13 is slid along the guide rail 45 to its original position, and the switching operation is over.

In the above-described arrangement, the robot mechanism 13 in place of an operator selects a required one 6A out of the second optical fibers 6 and switch the same 6A. As results, the switching operation and maintenance operations can be much improved.

The head 71 is accurately positioned and guided along a guide groove 91. In selecting a required second optical fiber 6A out of the second optical fibers 6 and switching the same, it is expected that the risk of the other second optical fibers 6 which have not been selected being damaged can be securely eliminated.

Figure 24:
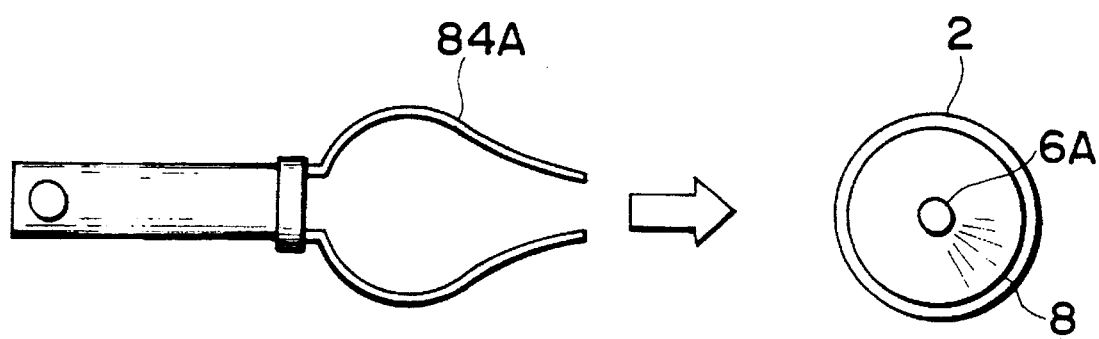
FIG. 24 shows a plan view of the fifth embodiment of the optical fiber switching apparatus according to the present invention.

Though the hand 84 of fork-shaped cross-section is used in this embodiment, a hand 84A having a leaf spring of U-shaped cross-section provided on the front as shown in FIG. 24, or others may be used with the same functional effect as in this embodiment achieved.

In this embodiment, a plurality of guide grooves 91 are formed in the top surface of the coupling board 1 inwardly as viewed in FIG. 19, but instead a plurality of guide members or the like may be juxtaposed on the top surface of the coupling board 1.

In this embodiment, the robot mechanism 13 has the structure as described above, but as long as a robot in place of an operator can select a required one 6A out of the second optical fibers 6 and switch the same, it is needless to say that the configuration, structure, etc. of the robot body 46, the arm 70 or the head 71 may be changed.

The apparatus of this embodiment can use the optical fiber length adjusting units 9 and other member of the above-described embodiments other than this embodiment still with the same functional effects as this embodiment.

As described above, according to the first embodiment of the invention, one conspicuous effect is that the disadvantage that the second optical fibers gather on the top surface of the coupling board to thereby adversely much lower the coupling operational efficiency, and cause frequent coupling errors can be eliminated without failure.

Another remarkable advantage is that the disadvantage that gathering of a plurality of optical fibers is unavoidably a very serious disadvantage in switching one slide terminal to another required slide terminal can be removed without failure.

Further another remarkable advantage provided by this invention is that since it is unnecessary to secure a large space in the coupling board for coupling optical fibers, the disadvantage of large sizes of the device can be easily solved.

According to the switching mechanism of the invention, it can be expected that the disadvantages of great drops of the coupling switching operational efficiency and frequent occurrences of erroneous coupling can be eliminated without failure. The problem that a required second optical fiber entangles with the other second optical fibers, whereby the coupling switching operation is made very difficult is expected to be solved.

A conspicuous effect that the disadvantage that in switching one of the slide terminals is switched to a different one thereof, the conjunction of the second optical fibers is a serious problem can be solved.

Further another remarkable advantage provided by this invention is that since it is unnecessary to secure a large space in the coupling board for coupling optical fibers, the disadvantage of large sizes of the device can be easily solved.

The conspicuous advantage that the disadvantage of large sizes of the device can be easily solved can be expected.

According to the second embodiment of the invention, a plurality of second optical fibers in rows are divided in columns, and besides, a required optical fiber holding unit can be displaced. The resultant advantage is that the switching means can make easier access to the second optical fibers The switching means can make access to a required second optical fiber without contacting the other second optical fibers. In coupling a number of optical fibers, their congestion can be effectively prevented.

According to the third embodiment of the invention, conspicuous advantages are that a plurality of second optical fibers gather on the top surface the coupling board, whereby the coupling operational efficiency is much lowered, and erroneous coupling frequently takes place can be eliminated.

Another remarkable advantage is that the disadvantage that gathering of the second optical fibers is unavoidably a very serious disadvantage in switching one slide terminal to another required slide terminal can be removed without failure.

Further another remarkable advantage is that since it is unnecessary to secure a large space in the coupling board for coupling optical fibers, the disadvantage of large sizes of the device can be easily solved.

A conspicuous advantage that since the optical fiber holding units are displaced into the paths of the switching means, the switching means can very easily hold a required second optical fiber can be expected.

Furthermore, a conspicuous advantage is that since the switching means is compact, the switching means is expected to be miniaturized, and the miniaturization can make the coupling board denser.

Furthermore, in the third embodiment of the invention, a force which has been acting radially inwardly on the side wall of the ferrule chuck is removed or weakened as the release button is lowered to cause the ferrule chick to restore its original configuration, and the ferrule chuck is released from its required second optical fiber holding state.

A resultant remarkable effect is that the disadvantage that a required second optical fiber comes off the coupling board due to a cause and adversely uncoupled from a first optical fiber can be removed.

Furthermore, a conspicuous effect is that the disadvantage that the device is not applicable to large-capacity optical communications used on the side of subscribers because one of a number of optical fibers arranged in a matrix is coupled with a single master fiber connected to a slide terminal can be easily removed.

According to the fourth embodiment of the invention, since the switching means in place of an operator automatically switches a selected second optical fiber, the conspicuous effects that the coupling switching operational efficiency is much improved, and the running cost can be lowered can be provided. An expected conspicuous effect is that the maintenance operational efficiency can be much improved.

Furthermore, a conspicuous effect is that since the constraining means brakes without failure the rotation of the rotary bodies gripping the second optical fibers which have not been selected, the non-selected second optical fibers can be prevented from damages.

According to the fifth embodiment of the invention, a conspicuous effect is that since the switching means in place of an operator selects a required one out of a plurality of second optical fibers and switches the same, the coupling switching operational efficiency and maintenance operational efficiency can be much improved.

Another effect is that since the switching means is accurately guided and positioned by the guide means, it is expected that when a required second optical fiber is selected out of the second optical fibers and switched, the other second optical fibers which have not been selected can be securely prevented from damages.

From the invention thus described, it will be obvious that the invention may be varied in many ways, Such variations are not to be regarded as a departure from the spirit and scope of the invention, and all such modifications as would be obvious to one skilled in the art are intended to be included within the scope of the following claims.

The basic Japanese Application Nos. 39602/1992 and 39607/1992 filed on Feb. 26, 1992; 104612/1992 filed on Apr. 23, 1992; 117361/1992 and 117363/1992 filed on May 11, 1992; 128777/1992 filed on May 21, 1992; and 17484/1993 filed on Feb. 4, 1993 are hereby incorporated by reference.

What is claimed is:

1. A transmission line switching apparatus comprising:
   a coupling board for coupling a selected one of a plurality of first transmission lines to a selected one of a plurality of second transmission lines, the coupling board having a first surface connected to the plurality of first lines, and a second surface which opposes the first surface and is connected to the plurality of second lines;
   adjusting means including a line length adjusting unit for handling surplus portions of the selected one of the plurality of second lines;
   partition means for dividing the second surface of the coupling board into a plurality of rows; and
   switching means for changing a connecting position of the selected one of the plurality of second lines to a desired position so that the selected one of the plurality of second lines can be connected with the selected one of the plurality of first lines by the coupling board.

2. A transmission line switching apparatus according to claim 1, wherein
   the coupling board is made up a plurality of line holding units, each line holding unit being movable along the first and second surfaces of the coupling board; and further comprising
   slide means for selectively moving one of the line holding units along the first and second surfaces of the coupling board.

3. A transmission line switching apparatus according to claim 1, wherein the switching means includes a robot mechanism disposed proximate to the coupling board, the robot mechanism comprising:
   a pair of X-directional screw rods disposed in parallel with respect to each other and perpendicular with respect to the plurality of rows of the second surface of the coupling board;
   a pair of X-directional nuts, each x-directional nut being supported by one of the X-directional screw rods and being movable along the X-directional screw rod;
   a rotatable Z-directional screw rod disposed between the pair of X-directional screw rods;
   a Z-directional nut supported by the Z-directional screw rod and being movable along the Z-directional screw rod;
   an arm portion supported by the Z-directional nut and being movable in a vertical direction with respect to the Z-directional screw rod; and
   a hand portion provided on the arm portion for holding a part of the selected second line.

4. A transmission line switching apparatus according to claim 3, further comprising
   a controller for controlling the operation of:
      moving the movable arm portion in X-direction to a position where the arm portion is proximate to a selected one of the rows of the coupling board, the selected one of the rows having the selected one of the plurality of second lines therein;
      moving the movable arm portion in a Y-direction along the selected row of the coupling board until the movable arm is proximate to the selected second line;
      holding a part of the selected second line by the hand portion;
      moving the movable Z-directional nut so as to pull the selected second line in a Z-direction and thereby removing the selected second line from the coupling board;
      retreating the movable arm portion along the selected row;
      moving the movable arm portion in the X-direction to a desired one of the rows;
      moving the movable arm position in the Y-direction along the desired row until the desired position is reached; and
      moving the Z-directional nut in the Z-direction so as to connect the selected second line with the selected first line.

5. A transmission line switching apparatus according to claim 3, further comprising
   a controller for controlling the operation of:
      pulling out an end of the selected one of the plurality of second lines from the coupling board; moving a portion of the selected second line into the line length adjusting unit so as to position an end of the selected second line near the line length adjusting unit;
      moving the end of the selected second line so as to draw out the selected second line from the line length adjusting means and so as to place the end of the selected second line near the desired connecting position; and
      connecting the selected second line to the selected first line.

6. A transmission line switching apparatus according to claim 3, wherein each of X-directional screw rods includes a round rod member, and each round rod member has a screw groove formed thereon.

7. A transmission line switching apparatus according to claim 3, wherein each of the X-directional nuts has a threaded hole through which one of the X-direction screw rods is placed.

8. A transmission line switching apparatus according to claim 3, wherein the Z-directional screw rod includes a round rod member, and the round rod member has a screw groove formed thereon.

9. A transmission line switching apparatus according to claim 3, wherein the Z-directional nut has a threaded hole through which the Z-directional screw rod is placed.

10. A transmission line switching apparatus according to claim 3, wherein the pair of X-directional screw rods and the Z-directional screw rod are each independently rotatable.

11. A transmission line switching apparatus according to claim 3, wherein the hand portion includes a U-shaped member.

12. A transmission line switching apparatus according to claim 1, wherein the coupling board has a plurality of connectors arranged in m rows×n columns, each of the connectors traversing from the first surface of the coupling board to the second surface of the coupling board, and wherein m and n are greater than 0.

13. A transmission line switching apparatus according to claim 1, wherein ends of the plurality of first lines are connected to the connectors proximate to the first surface of the coupling board, and ends of plurality of second lines are connected to the connectors proximate to the second surface of the coupling board.

14. A transmission line switching apparatus according to claim 1, wherein the coupling board has a plurality of connectors, each of the plurality of first lines having a first-line connector, a plurality of connectors being adapted thereto proximate to the first surface, and a plurality of connectors being adapted to have a selected one of second-line connectors of the second lines connected thereto proximate to the second surface.

15. A transmission line switching apparatus according to claim 14, wherein a part of each of the second-line connectors protrudes from the second surface of the coupling board when the second-line connector is inserted into a selected one of the connectors of the coupling board.

16. A transmission line switching apparatus according to claim 1, wherein the line length adjusting unit comprises a plurality of line length adjusting blocks; the line length adjusting unit is disposed proximate to the second surface of the coupling board; and the line length adjusting unit feeds the plurality of second lines to the second surface of the coupling board.

17. A transmission line switching apparatus according to claim 16, wherein the line length adjusting blocks are stacked in the horizontal direction with respect to the first and second surfaces of the coupling board.

18. A transmission line switching apparatus according to claim 16, wherein each of the line length adjusting blocks includes a pair of rotatable reels on which the surplus portion of a corresponding one of the plurality of second lines is wound.

19. A transmission line switching apparatus according to claim 18, wherein each of the line length adjusting blocks includes a flexible member for spacing each of the rotatable reels of the pair of rotatable reels from each other.

20. A transmission line switching apparatus according to claim 1, wherein the partition means comprises a plurality of U-shaped rods, and each of the U-shaped rods is disposed on the second surface of the coupling board.

21. A transmission line switching apparatus according to claim 20, wherein the U-shaped rods are disposed along each row of the second surface of the coupling board, thereby dividing the second surface of the coupling board in m rows, and wherein m is greater than 0.

22. A transmission line switching apparatus comprising:
a coupling board for coupling a selected one of a plurality of first transmission lines to a selected one of a plurality of second transmission lines, the coupling board having a first surface connected to the plurality of first lines, and a second surface which opposes the first surface and is connected to the plurality of second lines, wherein the coupling board is made up a plurality of line holding units, each line holding unit being movable along the first and second surfaces of the coupling board;

adjusting means including a line length adjusting unit for handling surplus portions of the selected one of the plurality of second lines;

partition means for dividing the second surface of the coupling board into a plurality of rows;

switching means for changing a connecting position of the selected one of the plurality of second lines to a desired position so that the selected one of the plurality of second lines can be connected with the selected one of the plurality of first lines by the coupling board; and slide means for selectively moving one of the line holding units along the first and second surfaces of the coupling board.

23. A transmission line switching apparatus according to claim 22, wherein each of the line holding units has a plurality of connectors corresponding to one of columns of the second lines.

24. A transmission line switching apparatus according to claim 23, wherein a part of each of the second-line connectors protrudes from the second surface of the coupling board when the second-line connector is inserted into a selected one of the connectors of the coupling board.

25. A transmission line switching apparatus according to claim 22, wherein each of the line holding units has a first and second surfaces which are opposite to each other; the first surface of the coupling board is defined by the first surface of each line holding unit; the second surface of the coupling board is defined by the second surface of the line holding unit; and each of the line holding units is displaceable in a direction of the row of the associated second lines.

26. A transmission line switching apparatus according to claim 22, wherein ends of the plurality of first lines are connected to the connectors proximate to the first surface of the coupling board, and ends of plurality of second lines are connected to the connectors proximate to the second surface of the coupling board.

27. A transmission line switching apparatus according to claim 22, wherein the line length adjusting unit comprises:
a plurality of line length adjusting blocks for lifting the second lines in the vertical direction with respect to the second surface of the coupling board; and
a housing disposed proximate to the plurality of line length adjusting blocks, for stowing unused portion of the second line.

28. A transmission line switching apparatus according to claim 27, wherein the line length adjusting blocks are stacked in the horizontal direction with respect to the first and second surfaces of the coupling board.

29. A transmission line switching apparatus according to claim 27, wherein each of the line length adjusting blocks includes a pair of rotatable reels on which the surplus portion of a corresponding one of the plurality of second lines is wound.

30. A transmission line switching apparatus according to claim 29, wherein each of the line length adjusting blocks includes a flexible member for spacing each of the rotatable reels of the pair of rotatable reels from each other.

31. A transmission line switching apparatus according to claim 22, wherein the partition means comprise a plurality of U-shaped rods, and each of the U-shaped rods is disposed on the second surface of the coupling board.

32. A transmission line switching apparatus according to claim 31, wherein the U-shaped rods are disposed along each row of the second surface of the coupling board, thereby dividing the second surface of the coupling board in m rows, and wherein m is greater than 0.

33. A transmission line switching apparatus according to claim 22, wherein the slide means is proximate to the line holding units and has a plurality of reciprocable levers which are connected to the respective line holding units, the slide means operating the movement of the associated lever with a selected one of the line holding units, based on an applied voltage.

34. A transmission line switching apparatus according to claim 22, wherein the switching means includes a robot mechanism disposed proximate to the coupling board, the robot mechanism comprises:

a pair of X-directional screw rods disposed in parallel with respect to each other and perpendicular with respect to the plurality of rows of the second surface of the coupling board;

a pair of X-directional nuts, each x-directional nut being supported by one of the X-directional screw rods and being movable along the X-directional screw rod;

a rotatable Z-directional screw rod disposed between the pair of X-directional screw rods;

a Z-directional nut supported by the Z-directional screw rod and being movable along the Z-directional screw rod;

an arm portion supported by the Z-directional nut and being movable in a vertical direction with respect to the Z-directional screw rod; and a hand portion provided on the arm portion for holding a part of the selected second line.

35. A transmission line switching apparatus according to claim 34, wherein each of X-directional screw rods includes a round rod member, and each round rod member has a screw groove formed thereon.

36. A transmission line switching apparatus according to claim 34, wherein each of the X-directional nuts has a threaded hole through which one of the X-direction screw rods is placed.

37. A transmission line switching apparatus according to claim 34, wherein the Z-directional screw rod includes a round rod member, and the round rod member has a screw groove formed thereon.

38. A transmission line switching apparatus according to claim 34, wherein the Z-directional nut has a threaded hole through which the Z-directional screw rod is placed.

39. A transmission line switching apparatus according to claim 34, wherein the pair of X-directional screw rods and the Z-directional screw rod are each independently rotatable.

40. A transmission line switching apparatus according to claim 34, wherein the hand portion includes a U-shaped member.

* * * * *